United States Patent
Griffin et al.

(10) Patent No.: US 12,293,259 B2
(45) Date of Patent: May 6, 2025

(54) QUBIT ALLOCATION SERVICE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 549 days.

(21) Appl. No.: 16/884,928

(22) Filed: May 27, 2020

(65) Prior Publication Data

US 2021/0374583 A1 Dec. 2, 2021

(51) Int. Cl.
*G06N 10/00* (2022.01)
*G06F 9/445* (2018.01)
*G06F 9/50* (2006.01)

(52) U.S. Cl.
CPC ......... *G06N 10/00* (2019.01); *G06F 9/44505* (2013.01); *G06F 9/5022* (2013.01)

(58) Field of Classification Search
CPC ........ G06N 10/00; G06N 10/80; G06N 20/00; G06F 9/44505; G06F 9/5022; G06F 9/5027; G06F 9/3877; G06F 9/546; G06F 9/4881; G06F 9/455; G06F 9/4494; G06F 9/30196; G06F 9/355; G06F 9/30; G06F 9/30101; G06F 9/382; G06F 9/5061; G06F 9/54; G06F 8/316; G06F 8/44; G06F 16/11; G06F 16/13; G06F 16/18; G06F 16/162; G06F 16/1734; G06F 11/3409; G06F 11/3466; G06F 11/36; G06F 30/20
See application file for complete search history.

(56) References Cited

U.S. PATENT DOCUMENTS

| | | |
|---|---|---|
| 7,451,292 B2 | 11/2008 | Routt |
| 7,639,035 B2 | 12/2009 | Berkley |
| 7,853,011 B2 | 12/2010 | Kuang et al. |
| 8,102,185 B2 | 1/2012 | Johansson et al. |
| 8,434,027 B2 | 4/2013 | Jones |
| 8,600,051 B2 | 12/2013 | Noh |
| 8,959,115 B2 | 2/2015 | Marathe |
| 9,264,226 B2 | 2/2016 | Harrison et al. |

(Continued)

FOREIGN PATENT DOCUMENTS

| | | |
|---|---|---|
| CN | 105164704 B | 7/2018 |
| CN | 109816112 A | 5/2019 |

(Continued)

OTHER PUBLICATIONS

U.S. Appl. No. 16/227,747, filed Dec. 20, 2018.

(Continued)

*Primary Examiner* — Un C Cho
*Assistant Examiner* — Rasha K Fayed
(74) *Attorney, Agent, or Firm* — Dority & Manning, P.A.

(57) ABSTRACT

Qubit allocation service is disclosed. A qubit allocation service determines that a first quantum service requires a qubit for execution. A qubit registry that maintains information about a plurality of qubits on a quantum computing system is accessed to identify a first qubit of the plurality of qubits that is available for allocation. Information indicating that the first qubit is allocated to the first quantum service is stored. The first quantum service is provided qubit information via which the first quantum service can determine that the first qubit is allocated to the first quantum service.

18 Claims, 22 Drawing Sheets

(56) References Cited

U.S. PATENT DOCUMENTS

| | | | |
|---|---|---|---|
| 9,495,644 | B2 | 11/2016 | Chudak et al. |
| 9,509,506 | B2 | 11/2016 | Hughes et al. |
| 9,537,953 | B1 | 1/2017 | Dadashikelayeh et al. |
| 9,774,401 | B1 | 9/2017 | Borrill |
| 9,847,913 | B2 | 12/2017 | Kanda et al. |
| 9,887,976 | B2 | 2/2018 | Hughes et al. |
| 10,331,658 | B2 | 6/2019 | Pennefather et al. |
| 10,592,216 | B1 | 3/2020 | Richardson et al. |
| 11,507,872 | B2 * | 11/2022 | Cao ........................ H03K 19/21 |
| 2003/0121028 | A1 | 6/2003 | Coury et al. |
| 2005/0193221 | A1 | 9/2005 | Yoneyama |
| 2012/0093521 | A1 | 4/2012 | Harrison et al. |
| 2012/0124092 | A1 | 5/2012 | Teranishi et al. |
| 2013/0308956 | A1 | 11/2013 | Meyers et al. |
| 2014/0254660 | A1 * | 9/2014 | La ........................ H04N 19/107 |
| | | | 375/240.02 |
| 2014/0365843 | A1 | 12/2014 | Ashikhmin |
| 2016/0071021 | A1 | 3/2016 | Raymond |
| 2017/0351974 | A1 | 12/2017 | Rose et al. |
| 2018/0091440 | A1 | 3/2018 | Dadashikelayeh et al. |
| 2018/0144262 | A1 | 3/2018 | Roetteler et al. |
| 2018/0181685 | A1 * | 6/2018 | Roetteler ................ G09C 1/00 |
| 2018/0330264 | A1 * | 11/2018 | Lanting ................ G06F 15/163 |
| 2018/0336371 | A1 | 11/2018 | Fortmann et al. |
| 2018/0365585 | A1 * | 12/2018 | Smith .................... G06F 9/5027 |
| 2019/0042392 | A1 * | 2/2019 | Matsuura ............... G06N 10/00 |
| 2019/0042971 | A1 * | 2/2019 | Zou ........................ G06F 15/16 |
| 2019/0102220 | A1 * | 4/2019 | Bishop .................. G06F 9/5072 |
| 2019/0179730 | A1 | 6/2019 | Geller et al. |
| 2019/0378032 | A1 * | 12/2019 | Kliuchnikov .......... G06N 10/40 |
| 2020/0074346 | A1 | 3/2020 | Griffin et al. |
| 2020/0116784 | A1 * | 4/2020 | Liu ........................ G06N 10/00 |
| 2020/0125402 | A1 | 4/2020 | Griffin et al. |
| 2020/0125983 | A1 * | 4/2020 | Hertzberg ............. H01L 49/006 |
| 2020/0125985 | A1 * | 4/2020 | Narang .................. G06N 3/126 |
| 2020/0133947 | A1 | 4/2020 | Wang |
| 2020/0160204 | A1 * | 5/2020 | Johnson ................ G06N 10/00 |
| 2020/0184025 | A1 | 6/2020 | Horii et al. |
| 2020/0184031 | A1 | 6/2020 | Horit |
| 2020/0184361 | A1 * | 6/2020 | Horii ........................ G06F 9/455 |
| 2020/0201655 | A1 | 6/2020 | Griffin et al. |
| 2020/0218787 | A1 * | 7/2020 | Doi ...................... G06F 30/3308 |
| 2020/0218842 | A1 * | 7/2020 | Itoko .................... G06F 30/327 |
| 2020/0227522 | A1 | 7/2020 | Leipold et al. |
| 2020/0272926 | A1 | 8/2020 | Chaplin et al. |
| 2020/0301562 | A1 | 9/2020 | Gupta et al. |
| 2020/0313063 | A1 | 10/2020 | Pollanen et al. |
| 2020/0358187 | A1 * | 11/2020 | Tran ........................ G06N 3/04 |
| 2020/0374211 | A1 | 11/2020 | Griffin et al. |
| 2020/0380877 | A1 * | 12/2020 | James .................. G08G 5/0034 |
| 2020/0387821 | A1 | 12/2020 | Griffin et al. |
| 2021/0027188 | A1 | 1/2021 | Nickerson et al. |
| 2021/0036846 | A1 | 2/2021 | Grice et al. |
| 2021/0058243 | A1 | 2/2021 | Starodubtsev |
| 2021/0157877 | A1 * | 5/2021 | Mezzacapo ............. G06F 17/16 |
| 2021/0173660 | A1 * | 6/2021 | Hogaboam ........... G06F 9/3851 |
| 2021/0182724 | A1 * | 6/2021 | Zou ........................ G06F 9/223 |
| 2021/0286599 | A1 * | 9/2021 | Gazda ...................... G06F 8/314 |
| 2021/0303155 | A1 | 9/2021 | Meister et al. |
| 2022/0019928 | A1 * | 1/2022 | Jiang ........................ G06F 15/16 |
| 2022/0083626 | A1 * | 3/2022 | McMahon .............. G06F 17/16 |
| 2022/0084085 | A1 * | 3/2022 | Rigetti .................... G06Q 30/08 |
| 2022/0318661 | A1 * | 10/2022 | Meijer .............. H01L 21/02576 |

FOREIGN PATENT DOCUMENTS

| | | |
|---|---|---|
| CN | 114503027 A | 5/2022 |
| JP | 6465876 B2 | 2/2019 |
| WO | 2016206498 A1 | 12/2016 |
| WO | 2018111242 A1 | 6/2018 |

OTHER PUBLICATIONS

U.S. Appl. No. 15/930,025, filed May 12, 2020.
U.S. Appl. No. 16/859,571, filed Apr. 27, 2020.
Cheng, S.T. et al., "Quantum Switching and Quantum Merge Sorting," IEEE Transactions on Circuits and Systems I: Regular Papers, vol. 53, Issue 2, Feb. 2006, IEEE, 10 pages.
Whitehouse, L., "Data deduplication methods: Block-level versus byte-leveldedupe," Nov. 24, 2008, https://www.techtarget.com/searchdatabackup/tip/Data-deduplication-methods-Block-level-versus-byte-level-dedupe, 2 pages.
Applicant-Initiated Interview Summary for U.S. Appl. No. 15/930,025, mailed Dec. 17, 2021, 3 pages.
Non-Final Office Action for U.S. Appl. No. 16/912,091, mailed Jan. 27, 2022, 14 pages.
Notice of Allowance for U.S. Appl. No. 16/227,747, mailed Jun. 10, 2021, 7 pages.
Barnum, H. et al., "Authentication of Quantum Messages," Proceedings of the 43rd Annual IEEE Symposium on Foundations of Computer Science, Nov. 2002, IEEE, 10 pages.
Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.
Chen, S., "What if Quantum Computers Used Hard Drives made of DNA?" Wired, Mar. 15, 2017, https://www.wired.com/2017/03/quantum-computers-used-hard-drives-made-dna/, 10 pages.
Choi, C., "A Data Bus for Quantum Computers," IEEE Spectrum, Nov. 9, 2017, https://spectrum.IEEE.org/tech-talk/computing/hardware/a-quantum-bus-for-quantum-computers, 3 pages.
Gühne, O., et al., "Entanglement detection," Physics Reports, vol. 474, No. 1, Feb. 27, 2009, 90 pages.
Lee, C., "New form of qubit control may yield longer computation times," Ars Technica, Jan. 26, 2018, Wired Media Group, 5 pages.
Mina, M., et al., "EntangleNet: Theoretical Reestablishment of Entanglement in Quantum Networks," Applied Science, vol. 8, Issue 10, Oct. 16, 2018, 17 pages.
Pathumsoot, P., et al., "Modeling of Measurement-based Quantum Network Coding on IBM Q Experience Devices," arXiv: 1910.00815v2 [quant-ph], Nov. 12, 2019, 10 pages.
Schoute, E., et al., "Shortcuts to Quantum Network Routing," Jul. 9, 2016, available online at https://obj.umiacs.umd.edu/extended_abstracts/QCrypt_2016_paper_203.pdf, 2 pages.
Sillanpaa, M. et al., "Coherent quantum state storage and transfer between two phase qubits via a resonant cavity," Nature, vol. 449, Sep. 2007, Nature Publishing Group, pp. 438-442.
Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation%20of%20Quantum%20Merging%20Negative.pdf, 5 pages.
Yamasaki, H. et al., "Quantum State Merging for Arbitrarily Small-Dimensional Systems," IEEE Transactions on Information Theory, vol. 65, No. 6, Jun. 2019, IEEE, pp. 3950-3972.
Yang, C., et al., "Entanglement generation and quantum information transfer between spatiallY-separated qubits in different cavities," New Journal of Physics, vol. 15, Nov. 1, 2013, 19 pages.
Non-Final Office Action for U.S. Appl. No. 15/930,025, mailed Oct. 1, 2021, 10 pages.
Non-Final Office Action for U.S. Appl. No. 16/859,571, mailed Oct. 28, 2021, 9 pages.
Notice of Allowance for U.S. Appl. No. 16/909,477, mailed Feb. 2, 2023, 13 pages.
Non-Final Office Action for U.S. Appl. No. 17/883,280, mailed Jan. 18, 2023, 22 pages.
Notice of Allowance for U.S. Appl. No. 16/912,200, mailed Oct. 13, 2022, 9 pages.
Notice of Allowance for U.S. Appl. No. 16/912,091, mailed Sep. 14, 2022, 10 pages.
Notice of Allowance and Examiner-Initiated Interview Summary for U.S. Appl. No. 15/930,025, mailed Apr. 8, 2022, 13 pages.
Notice of Allowance, Examiner's Amendment, and Examiner-Initiated Interview Summary for U.S. Appl. No. 16/912,045, mailed Oct. 4, 2022, 12 pages.
Non-Final Office Action for U.S. Appl. No. 16/909,477, mailed Sep. 30, 2022, 34 pages.

(56) References Cited

OTHER PUBLICATIONS

Non-Final Office Action for U.S. Appl. No. 16/912,200, mailed May 12, 2022, 39 pages.
Non-Final Office Action for U.S. Appl. No. 16/912,045, mailed Apr. 14, 2022, 9 pages.
Non-Final Office Action for U.S. Appl. No. 16/859,571, mailed May 20, 2022, 21 pages.
Final Office Action and Examiner Interview Summary for U.S. Appl. No. 16/859,571, mailed Dec. 8, 2022, 14 pages.
Final Office Action for U.S. Appl. No. 16/912,091, mailed Jun. 20, 2022, 14 pages.
Non-Final Office Action for U.S. Appl. No. 16/859,571, mailed Jun. 8, 2023, 17 pages.
Notice of Allowance and Notice of Allowability for U.S. Appl. No. 17/883,280, mailed Aug. 30, 2023, 11 pages.
Corrected Notice of Allowability for U.S. Appl. No. 16/859,571, mailed Oct. 6, 2023, 13 pages.
Notice of Allowance and Notice of Allowability for U.S. Appl. No. 16/859,571, mailed Sep. 26, 2023, 20 pages.

\* cited by examiner

— 1 —

QUBIT ALLOCATION SERVICE

BACKGROUND

Quantum computing utilizes qubits to perform quantum calculations. Qubits are finite resources. As quantum computing continues to increase in popularity and become more commonplace, an ability to coordinate access to qubits from multiple potential quantum services will be desirable.

SUMMARY

The examples disclosed herein implement a qubit allocation service that allocates qubits to quantum services and ensures that allocated qubits are not concurrently allocated to multiple different quantum services inadvertently.

In one example a method is provided. The method includes determining, by a qubit allocation service, that a first quantum service requires a qubit for execution. The method further includes accessing, by the qubit allocation service, a qubit registry that maintains information about a plurality of qubits on a quantum computing system to identify a first qubit of the plurality of qubits that is available for allocation. The method further includes storing information indicating the first qubit is allocated to the first quantum service. The method further includes providing, by the qubit allocation service to the first quantum service, qubit information via which the first quantum service can determine that the first qubit is allocated to the first quantum service.

In another example a quantum computing system is provided. The quantum computing system includes a memory, and a processor device coupled to the memory. The processor device is to determine, by a qubit allocation service, that a first quantum service requires a qubit. The processor device is further to access, by the qubit allocation service, a qubit registry that maintains information about a plurality of qubits on a quantum computing system to identify a first qubit that is available for allocation. The processor device is further to store information indicating the first qubit is allocated to the first quantum service. The processor device is further to provide, by the qubit allocation service to the first quantum service, an identifier via which the first quantum service can determine that the first qubit is allocated to the first quantum service.

In another example a computer program product is provided. The computer program product is stored on a non-transitory computer-readable storage medium and includes instructions to cause a processor device to determine that a first quantum service requires a qubit. The instructions further cause the processor device to access a qubit registry that maintains information about a plurality of qubits on a quantum computing system to identify a first qubit that is available for allocation. The instructions further cause the processor device to store information indicating the first qubit is allocated to the first quantum service. The instructions further cause the processor device to provide, to the first quantum service, an identifier via which the first quantum service can determine that the first qubit is allocated to the first quantum service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
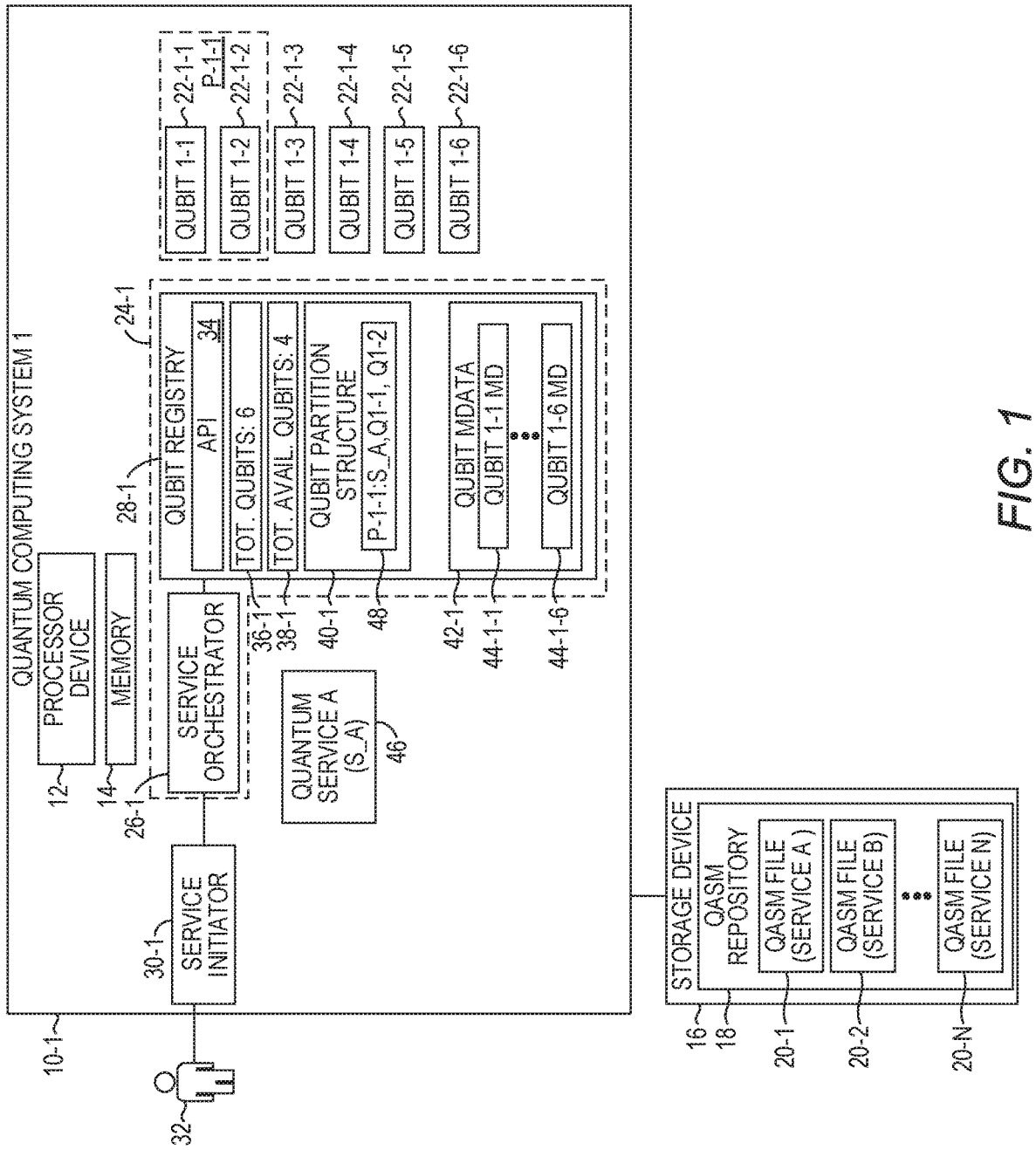
FIG. 1 is a block diagram of a quantum computing system suitable for implementing a qubit allocation service according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Flowcharts and message sequence diagrams are necessarily discussed herein in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources. As quantum computing continues to increase in popularity and become more commonplace, an ability to coordinate access to qubits from multiple potential quantum services will be desirable. In classical computing systems an operating system implements logical constructs, such as file partitions, to inhibit, or make it more difficult, for one application from being able to access another application's files. It would be desirable for a quantum computing system to also coordinate access to qubits to ensure that one quantum service does not inadvertently, or intentionally, access a qubit that is in-use by another quantum service.

The examples disclosed herein implement a qubit allocation service that allocates qubits to quantum services and ensures that allocated qubits are not concurrently allocated to multiple different quantum services inadvertently. In particular, a qubit allocation service maintains a qubit registry that stores information about a quantum computing system's qubits. Upon determining that a quantum service requires a qubit for execution, the qubit allocation service accesses the qubit registry to identify an available qubit. Information is stored in the qubit registry to indicate that the qubit is allocated and thus no longer available for allocation, and the qubit allocation service provides to the quantum service a qubit identifier that identifies the qubit so that the quantum service can utilize the qubit. In this manner, the qubit allocation service inhibits inadvertent access to the same qubits and ensures coordinated access to qubits, which implements both security as well as ensuring that entangled qubits are not inadvertently disentangled by an inadvertent access from a quantum service.

FIG. 1 is a block diagram of a quantum computing system 10-1 in which examples may be practiced. The quantum computing system 10-1 operates in a quantum environment but can operate using classical computing principles or quantum computing principles. When using quantum computing principles, the quantum computing system 10-1 performs computations that utilize quantum-mechanical phenomena, such as superposition and entanglement. The quantum computing system 10-1 may operate under certain environmental conditions, such as at or near 0° Kelvin. When using classical computing principles, the quantum computing system 10-1 utilizes binary digits that have a value of either 1 or 0.

The quantum computing system 10-1 includes one or more processor devices 12 and a memory 14. The quantum computing system 10-1 is communicatively coupled to a storage device 16 on which a quantum assembly (QASM) repository 18 is stored. The QASM repository 18 includes a plurality of QASM files 20-1, 20-2-20-N, each of which implements a quantum service.

The quantum computing system 10-1 implements a plurality of qubits 22-1-1-22-1-6 (generally, qubits 22). The quantum computing system 10-1 is capable of initiating a plurality of different quantum services. The term "quantum service" as used herein refers to a quantum application that accesses one or more qubits, such as one or more of the qubits 22, and provides some desired functionality. Each quantum service is implemented via a corresponding QASM file 20-1-20-N, each of which comprises quantum computing instructions. In this example, the QASM file 20-1 corresponds to a quantum service A; the QASM file 20-2 corresponds to a quantum service B; and the QASM file 20-N corresponds to a quantum service N. The QASM repository 18 may contain tens, hundreds, thousands or more QASM files 20-1-20-N.

The quantum computing system 10-1 includes a qubit allocation service 24-1. The qubit allocation service 24-1 can be implemented via any number of functional blocks and data structures. Solely for purposes of illustration, the qubit allocation service 24-1 will be described as comprising a service orchestrator 26-1 and a qubit registry 28-1, but it will be apparent that the functionality described herein with respect to the service orchestrator 26-1 and the qubit registry 28-1 could be divided into any number of functional processes and data structures. In some implementations the qubit registry 28-1 may be a data structure, and functional processing is implemented by the service orchestrator 26-1. In other implementations, such as the implementation described herein, the qubit registry 28-1 may be a combination of one or more data structures and functional components that implement functionality in addition to the functionality implemented by the service orchestrator 26-1. It will be noted that, because the service orchestrator 26-1 and the qubit registry 28-1 are components of the qubit allocation service 24-1, functionality implemented by the service orchestrator 26-1 and/or the qubit registry 28-1 may at times herein be attributed to the qubit allocation service 24-1.

Moreover, because the qubit allocation service 24-1 itself is a component of the quantum computing system 10-1, functionality implemented by the qubit allocation service 24-1 may be attributed to the quantum computing system 10-1 generally. Moreover, in examples where the qubit allocation service 24-1 comprises software instructions that program the processor device 12 to carry out functionality discussed herein, functionality implemented by the qubit allocation service 24-1 may be attributed herein to the processor device 12.

A service initiator 30-1 may communicate with the service orchestrator 26-1 to initiate a quantum service. By way of non-limiting example, the service initiator 30-1 may be a scheduler function that initiates quantum services via the service orchestrator 26-1 in accordance with a schedule, or may comprise an operator user interface (UI) with which an operator 32 interacts to initiate quantum services via the service orchestrator 26-1.

The service orchestrator 26-1 communicates with the qubit registry 28-1 via any suitable inter-process communications mechanism. In some implementations, the service orchestrator 26-1 communicates with the qubit registry 28-1 via an application programming interface (API) 34. The qubit registry 28-1 maintains information about the qubits 22-1-1-22-1-6, including, by way of non-limiting example, a total qubits counter 36-1 via which the qubit allocation service 24-1 keeps track of the total number of qubits implemented by the quantum computing system 10-1, a total available qubits counter 38-1 via which the qubit allocation service 24-1 keeps track of the total number of qubits that are currently available for allocation, and a qubit partition structure 40-1 used by the qubit allocation service 24-1 to implement qubit partitions, as discussed in greater detail below. The qubit registry 28-1 also maintains qubit metadata 42-1, which comprises a plurality of metadata records 44-1-1-44-1-6, each of which maintains information about a corresponding qubit 22-1-1-22-1-6, such as, by way of non-limiting example, an identifier of the corresponding qubit 22-1-1-22-1-6, a quantum service identifier of the quantum service currently using the corresponding qubit 22-1-1-22-1-6, whether the corresponding qubit 22-1-1-22-1-6 is currently in an entangled state, or the like.

At the point in time illustrated in FIG. 1, a quantum service 46 is executing on the quantum computing system 10-1. A qubit partition record 48 is associated with the quantum service 46 and indicates that the quantum service 46 has "ownership" of the two qubits 22-1-1 and 22-1-2. The qubit partition record 48 implements a qubit partition P-1-1, which partitions the qubits 22-1-1 and 22-1-2 from the qubits 22-1-3-22-1-6, and which limits the view of the qubit registry 28-1, by the quantum service 46, to the qubits 22-1-1 and 22-1-2. The total qubits counter 36-1 contains a value of six, and the total available qubits counter 38-1 contains a value of four, since the two qubits 22-1-1 and 22-1-2 have been allocated to the quantum service 46.

As will be discussed in greater detail below, the quantum service 46 interacts with the service orchestrator 26-1 to obtain qubits, such as the qubits 22-1-1 and 22-1-2. In some implementations, the quantum service 46 may interact directly with the qubit registry 28-1 via the API 34 to obtain certain information about any qubits that have been allocated to the quantum service 46. For example, the quantum service 46 may request how many qubits of the quantum computing system 10-1 are available to the quantum service 46. The qubit registry 28-1 determines that the quantum service 46 is associated with the qubit partition record 48, accesses the qubit partition record 48, and responds to the quantum service 46 that the quantum service 46 has access to two qubits, qubits 22-1-1 and 22-1-2. The quantum service 46 may access the qubit registry 28-1 directly via the API 34 to obtain the metadata records 44-1-1 and 44-1-2 that correspond to the qubits 22-1-1 and 22-1-2. If the quantum service 46 has not been allocated any qubits 22-1-1-22-1-6, then the qubit registry 28-1 would respond to any queries from the quantum service 46 with responses that indicate that the quantum service 46 has access to no qubits. For example, if none of the qubits 22-1-1-22-1-6 have been allocated to the quantum service 46, and the quantum service 46 requests how many qubits are available to the quantum service 46, the qubit registry 28-1 responds that no qubits are available to the quantum service 46.

Figure 2:
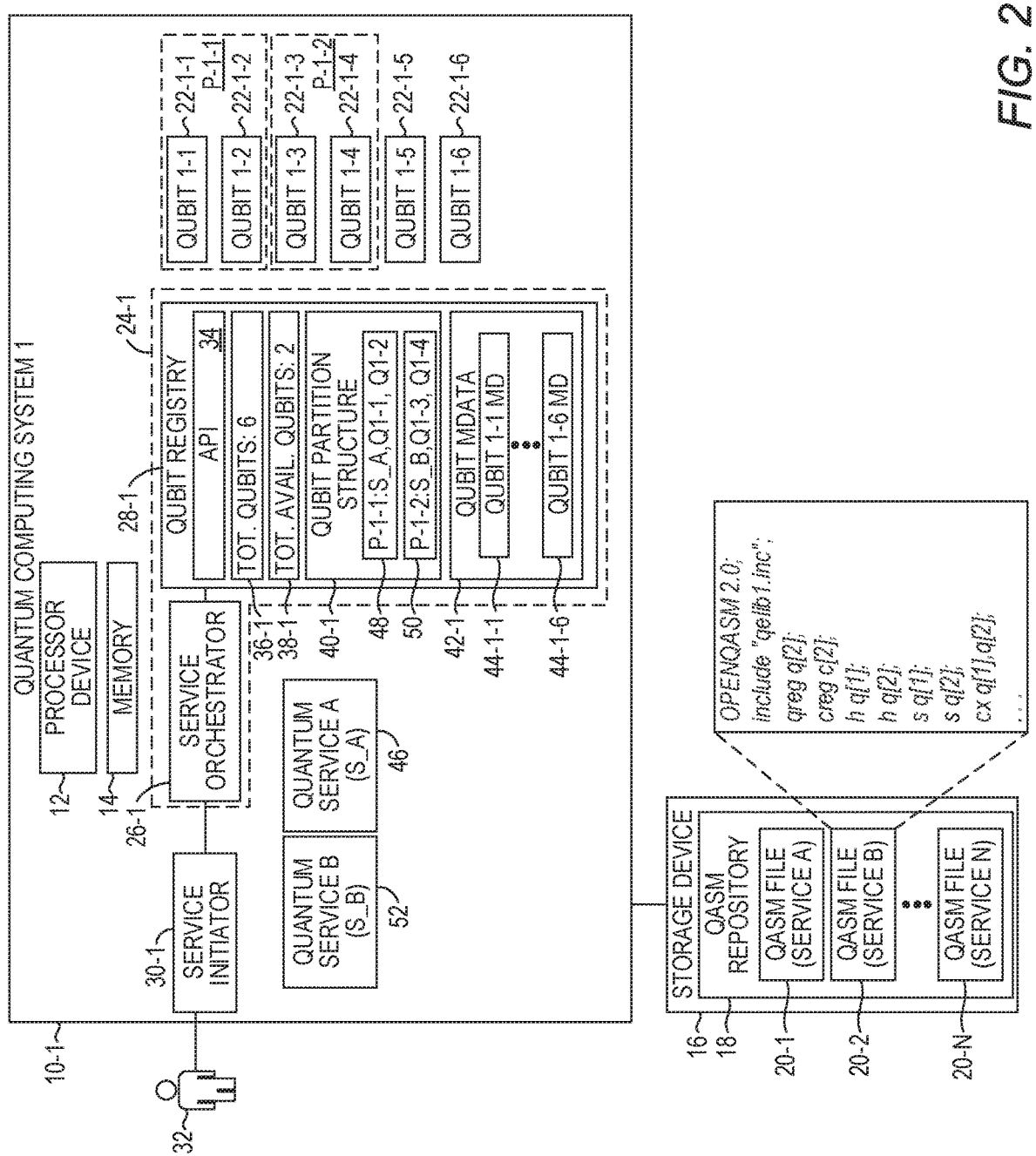
FIG. 2 is a block diagram of the quantum computing system illustrated in FIG. 1 at a subsequent point in time to that illustrated in FIG. 1.
Figure 3:
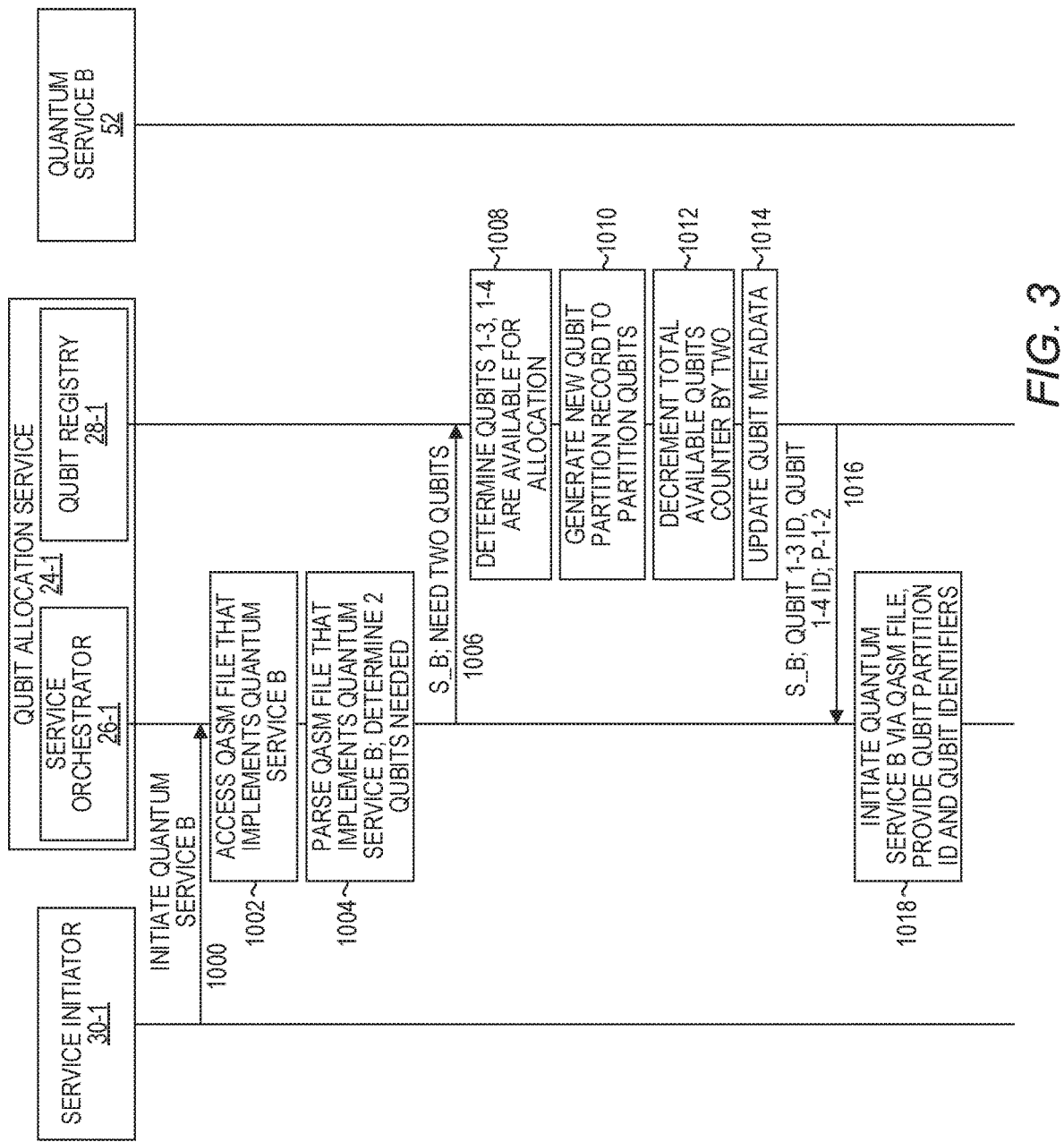
FIG. 3 is a message flow diagram illustrating an example message flow between components illustrated in FIG. 2 during the allocation of qubits to a quantum service according to one implementation.

FIG. 2 is a block diagram of the quantum computing system 10-1 illustrated in FIG. 1 according to another example. FIG. 3 is a message flow diagram illustrating an example message flow between components illustrated in FIG. 2 during the allocation of qubits to a quantum service according to one implementation. FIGS. 2 and 3 will be discussed in conjunction with one another. Referring first to FIG. 3, the service initiator 30-1 sends a message to the service orchestrator 26-1 to initiate a quantum service B (FIG. 3, block 1000). The service orchestrator 26-1 receives the request, and determines that the QASM file 20-2 corresponds to the quantum service B. The service orchestrator 26-1 accesses the QASM file 20-2 (FIG. 3, block 1002). The service orchestrator 26-1 parses the respective QASM file 20-2 in accordance with a QASM programming language syntax. The service orchestrator 26-1 determines, via the analysis of the QASM file 20-2, that two qubits are needed by the quantum service B (FIG. 3, block 1004).

The service orchestrator 26-1 accesses the qubit registry 28-1 to identify the qubits 22-1-3 and 22-1-4 as being available for allocation to the quantum service B. In an implementation wherein the qubit registry 28-1 includes both one or more data structures and functional processes, the service orchestrator 26-1 accesses the qubit registry 28-1 to identify the qubits 22-1-3 and 22-1-4 as being available for allocation by sending a request for two qubits for the quantum service B to the qubit registry 28-1 (FIG. 3, block 1006). In this implementation, the request includes an identifier of the quantum service B. The qubit registry 28-1 determines that the qubits 22-1-3 and 22-1-4 are available for allocation (FIG. 3, block 1008). The qubit registry 28-1 generates a new qubit partition record 50 to generate a new partition P-1-2 that includes the qubits 22-1-3 and 22-1-4 (FIG. 2) (FIG. 3, block 1010).

The qubit registry 28-1 decrements the total available qubits counter 38-1 by two (FIG. 3, block 1012). The qubit registry 28-1 updates the metadata records that correspond to the qubits 22-1-3 and 22-1-4 to indicate that the qubits 22-1-3 and 22-1-4 are currently allocated to the quantum service B and are in partition P-1-2 (FIG. 3, block 1014). The qubit registry 28-1 sends qubit identifiers that identify the qubits 22-1-3 and 22-1-4 and a qubit partition identifier that identifies the partition P-1-2 to the service orchestrator 26-1 (FIG. 3, block 1016). The service orchestrator 26-1 receives the qubit identifiers that identify the qubits 22-1-3 and 22-1-4 and the qubit partition identifier that identifies the partition P-1-2. The service orchestrator 26-1 then initiates a quantum service 52 (quantum service B) from the QASM file 20-2, and provides qubit information via which the quantum service 52 can determine that the qubits 22-1-3 and 22-1-4 have been allocated to the quantum service 52 (FIG. 2) (FIG. 3, block 1018). In some implementations, the qubit information may include the qubit partition identifier and the qubit identifiers. In other implementations, the qubit information may include only the partition identifier, and the quantum service 52 may then query the qubit registry 28-1 directly to obtain the qubit identifiers that identify the qubits 22-1-3 and 22-1-4.

Figure 4A:
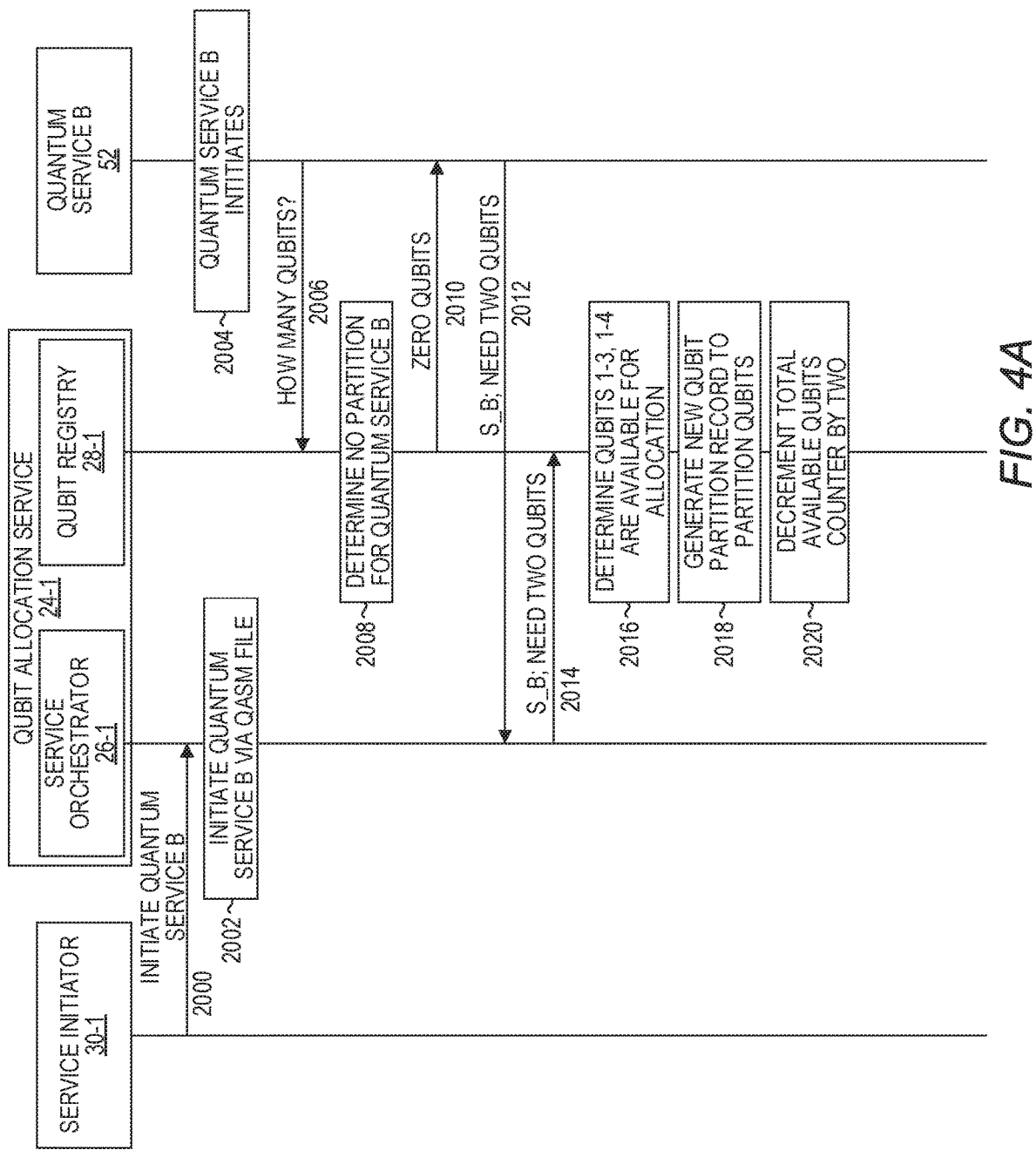
FIGS. 4A-4B illustrate a message flow diagram of an example message flow between components illustrated in FIG. 2 during the allocation of qubits to a quantum service according to another implementation.
Figure 4B:
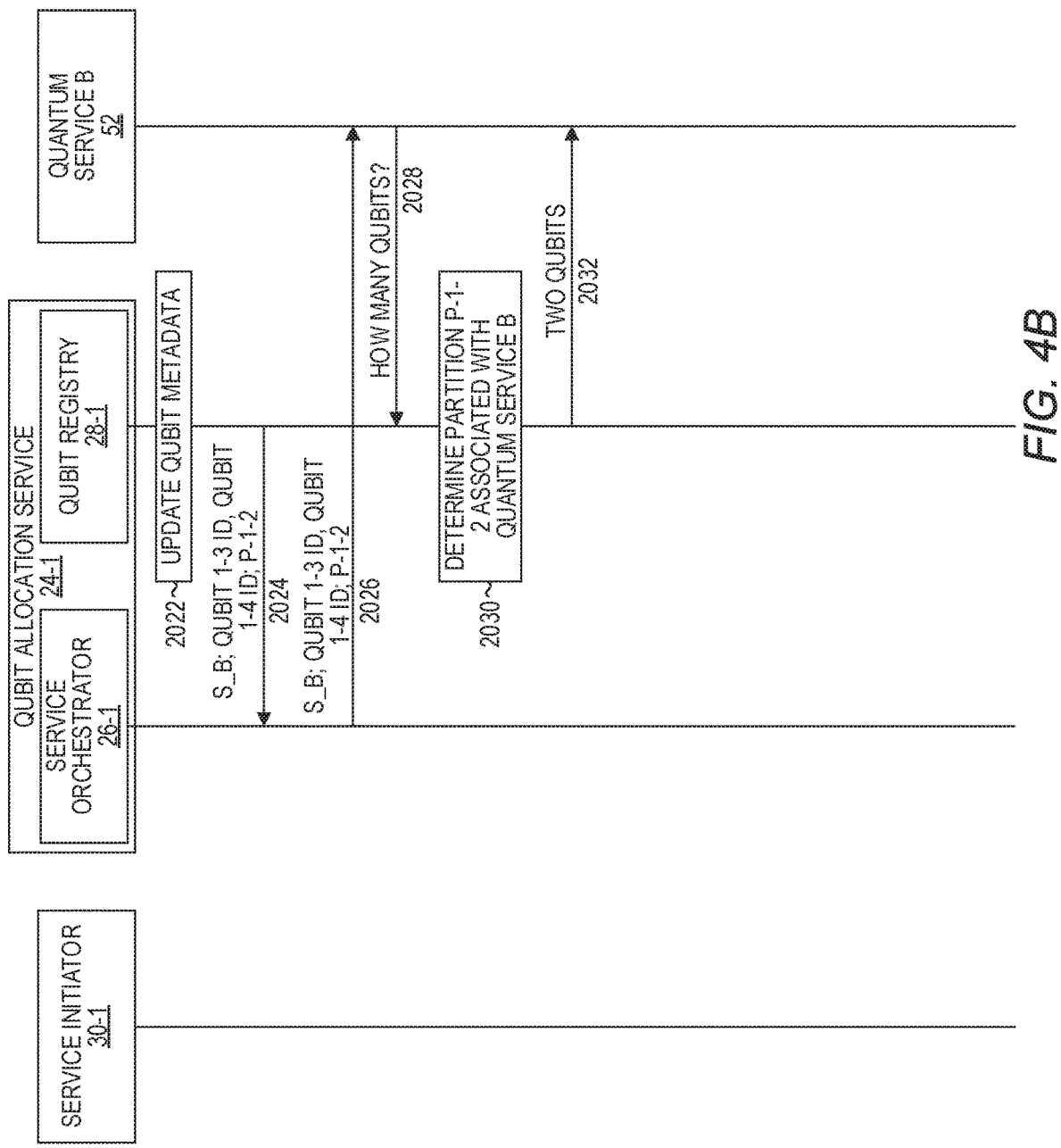

FIGS. 4A-4B illustrate a message flow diagram of an alternate example message flow between components illustrated in FIG. 2 during the allocation of qubits to a quantum service according to another implementation. FIGS. 2 and 4A-4B will be discussed in conjunction with one another. Referring first to FIG. 4A, the service initiator 30-1 sends a message to the service orchestrator 26-1 to initiate the quantum service B (FIG. 4A, block 2000). The service orchestrator 26-1 receives the request, and determines that the QASM file 20-2 corresponds to the quantum service B. The service orchestrator 26-1 initiates the quantum service 52 (quantum service B) (FIG. 4A, block 2002). The quantum service 52 initiates (FIG. 4A, block 2004). Solely for purposes of illustration, assume that the quantum service 52 interacts with the API 34 to ask the qubit registry 28-1 how many qubits are available to the quantum service 52 (FIG. 4A, block 2006). The qubit registry 28-1 determines that there are no qubit partitions associated with the quantum service 52, and sends a response to the quantum service 52 that no qubits are available for the quantum service 52 (FIG. 4A, blocks 2008-2010).

The quantum service 52 sends a request to the service orchestrator 26-1 requesting two qubits (FIG. 4A, block 2012). The service orchestrator 26-1 accesses the qubit registry 28-1 to identify the qubits 22-1-3 and 22-1-4 as being available for allocation by sending a request for two qubits for the quantum service 52 to the qubit registry 28-1 (FIG. 4A, block 2014). In this implementation, the request includes an identifier of the quantum service 52. The qubit registry 28-1 determines that the qubits 22-1-3 and 22-1-4 are available for allocation (FIG. 3, block 2016). The qubit registry 28-1 generates the new qubit partition record 50 to generate the new partition P-1-2 that includes the qubits 22-1-3 and 22-1-4 (FIG. 2) (FIG. 4A, block 2018). The qubit registry 28-1 decrements the total available qubits counter 38-1 by two (FIG. 4A, block 2020).

Referring now to FIG. 4B, the qubit registry 28-1 updates the metadata records corresponding to the qubits 22-1-3 and 22-1-4 to indicate that the qubits 22-1-3 and 22-1-4 are currently allocated to the quantum service 52 and are in partition P-1-2 (FIG. 4B, block 2022). The qubit registry 28-1 sends qubit identifiers that identify the qubits 22-1-3 and 22-1-4 and a qubit partition identifier that identifies the partition P-1-2 to the service orchestrator 26-1 (FIG. 4B, block 2024). The service orchestrator 26-1 receives the qubit identifiers that identify the qubits 22-1-3 and 22-1-4 and the qubit partition identifier that identifies the partition P-1-2. The service orchestrator 26-1 then provides qubit information to the quantum service 52 via which the quantum service 52 can determine that the qubits 22-1-3 and 22-1-4 have been allocated to the quantum service 52 (FIG. 4B, block 2026). In some implementations, the qubit information may include the qubit partition identifier and the qubit identifiers. In other implementations, the qubit information may include only the partition identifier, and the quantum service 52 may then query the qubit registry 28-1 directly to obtain the qubit identifiers that identify the qubits 22-1-3 and 22-1-4.

The quantum service 52 interacts with the API 34 to ask the qubit registry 28-1 how many qubits are available to the quantum service 52 (FIG. 4B, block 2028). The qubit registry 28-1 determines that the partition P-1-2 is associated with the quantum service 52 (FIG. 4B, block 2030). The qubit registry 28-1 sends a response to the quantum service 52 that two qubits are available for the quantum service 52 (FIG. 4B, block 2032).

Figure 5:
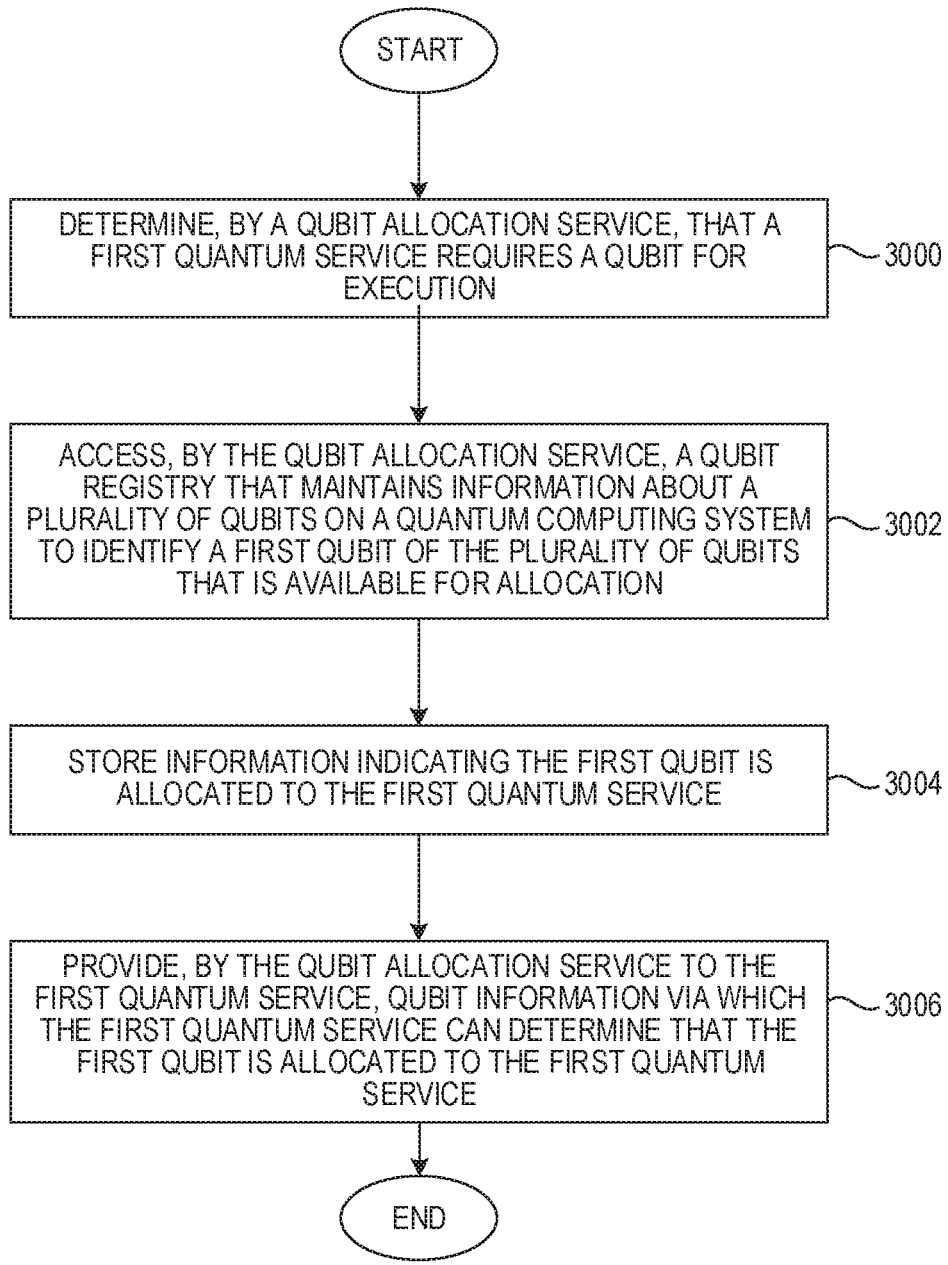
FIG. 5 is a flowchart of a method for allocating qubits according to one implementation.

FIG. 5 is a flowchart of a method for allocating qubits according to one implementation. FIG. 5 will be discussed in conjunction with FIG. 2. The qubit allocation service 24-1 determines that the quantum service 52 requires a qubit 22-1-1-22-1-6 for execution (FIG. 5, block 3000). The qubit allocation service 24-1 accesses the qubit registry 28-1 that maintains information about the plurality of qubits 22-1-1-22-1-6 on the quantum computing system 10-1 to identify the qubits 22-1-3-22-1-4 of the plurality of qubits 22-1-1-22-1-6 that are available for allocation (FIG. 5, block 3002). The qubit allocation service 24-1 stores information indicating the qubits 22-1-3-22-1-4 are allocated to the quantum service 52 (FIG. 5, block 3004). The information may comprise, for example, the qubit partition record 50. The qubit allocation service 24-1 provides, to the quantum service 52, qubit information via which the quantum service 52 can determine that the qubits 22-1-3-22-1-4 are allocated to the quantum service 52 (FIG. 5, block 3006).

Figure 6:
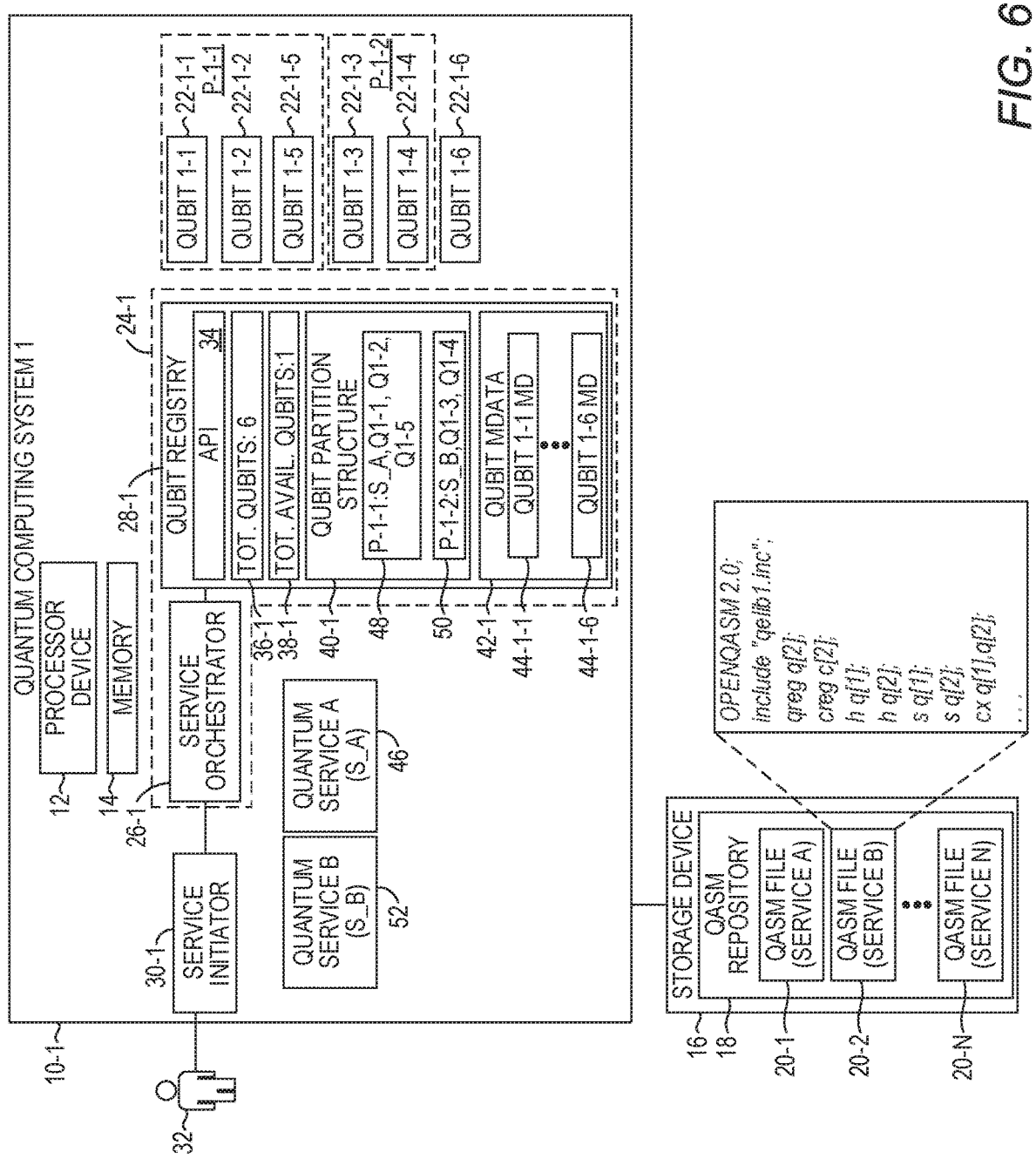
FIG. 6 is a block diagram of the quantum computing system illustrated in FIGS. 1 and 2 at a subsequent point in time to that illustrated in FIG. 2.
Figure 7:
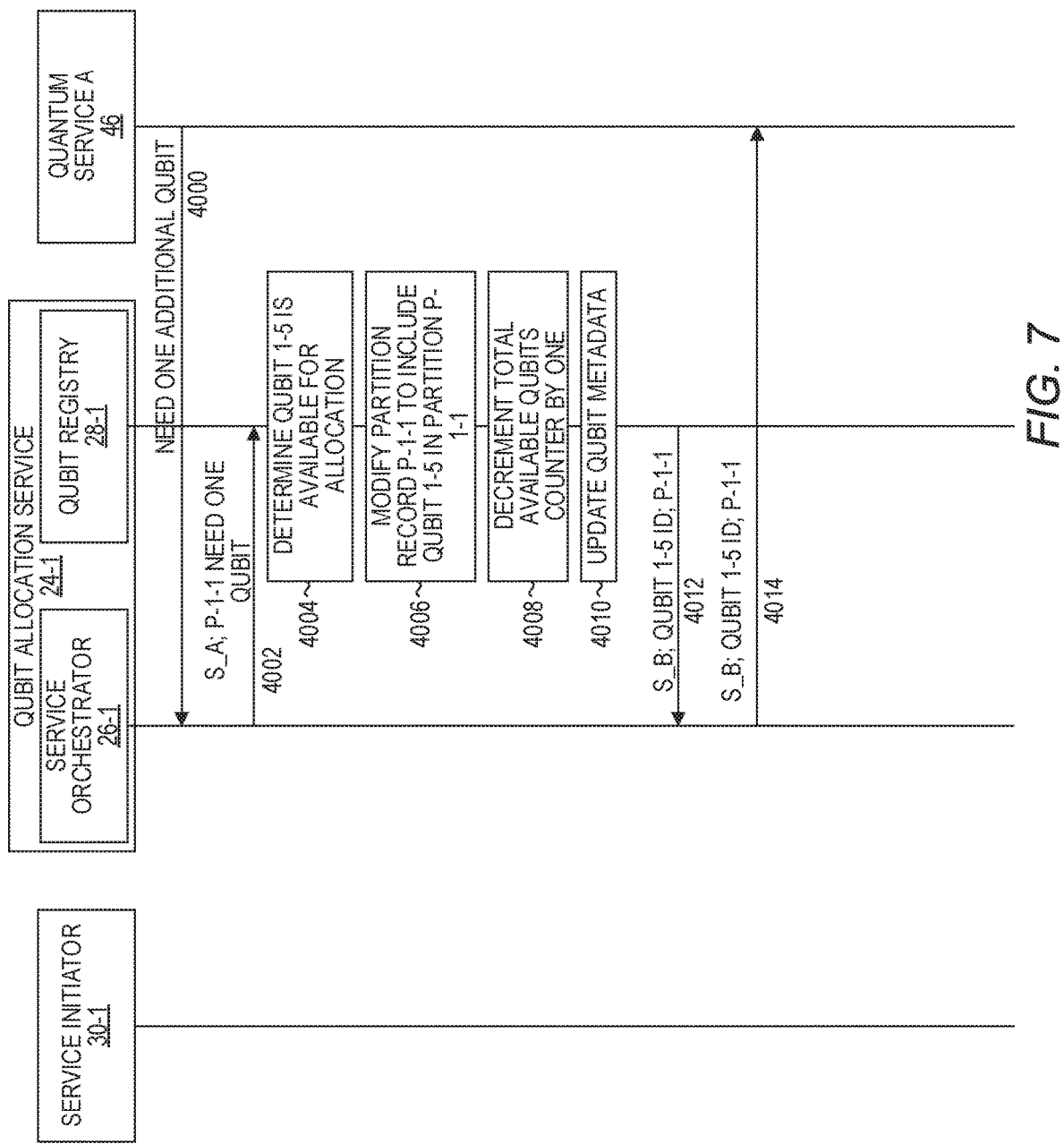
FIG. 7 is a message flow diagram illustrating an example message flow between components illustrated in FIG. 6 during the allocation of additional qubits to an executing quantum service according to one implementation.

FIG. 6 is a block diagram of the quantum computing system 10-1 at a subsequent point in time to that illustrated in FIG. 2, after an additional qubit has been allocated to the quantum service 46, according to one implementation. FIG. 7 is a message flow diagram illustrating an example message flow between components illustrated in FIG. 6 during the allocation of the additional qubit to the quantum service 46, according to one implementation. FIGS. 6 and 7 will be discussed in conjunction with one another. Referring first to FIG. 7, assume for purposes of illustration that in accordance with the processing instructions of the quantum service 46 (quantum service A), the quantum service 46 requires an additional qubit. The quantum service 46 sends a request to the service orchestrator 26-1 requesting an additional qubit (FIG. 7, block 4000). The service orchestrator 26-1 receives the request, and sends a request to the qubit registry 28-1, requesting an additional available qubit for the quantum service 46 (FIG. 7, block 4002). The request may identify the quantum service A, as well as the partition identifier of the qubit partition that is associated with the quantum service A. The qubit registry 28-1 receives the request, and determines that the qubit 22-1-5 is available for allocation (FIG. 7, block 4004). The qubit registry 28-1 modifies the qubit partition record 48 to include the qubit 22-1-5 (FIG. 7, block 4006). The qubit registry 28-1 decrements the total available qubits counter 38-1 by one (FIG. 7, block 4008). The qubit registry 28-1 updates the metadata record that corresponds to the qubit 22-1-5 to indicate that the qubit 22-1-5 is currently allocated to the quantum service 46 and is in partition P-1-1 (FIG. 7, block 4010). The qubit registry 28-1 sends a qubit identifier that identifies the qubit 22-1-5 and a qubit partition identifier that identifies the partition P-1-1 to the service orchestrator 26-1 (FIG. 7, block 4012). The service orchestrator 26-1 receives the qubit identifier that identifies the qubit 22-1-5 and the qubit partition identifier that identifies the partition P-1-1. The service orchestrator 26-1 then provides qubit information to the quantum service 46 via which the quantum service 46 can determine that the qubit 22-1-5 has been allocated to the quantum service 46 (FIG. 7, block 4014). For example, the qubit information may comprise the qubit identifier of the qubit 22-1-5 and/or the qubit partition identifier that identifies the partition P-1-1.

Figure 8:
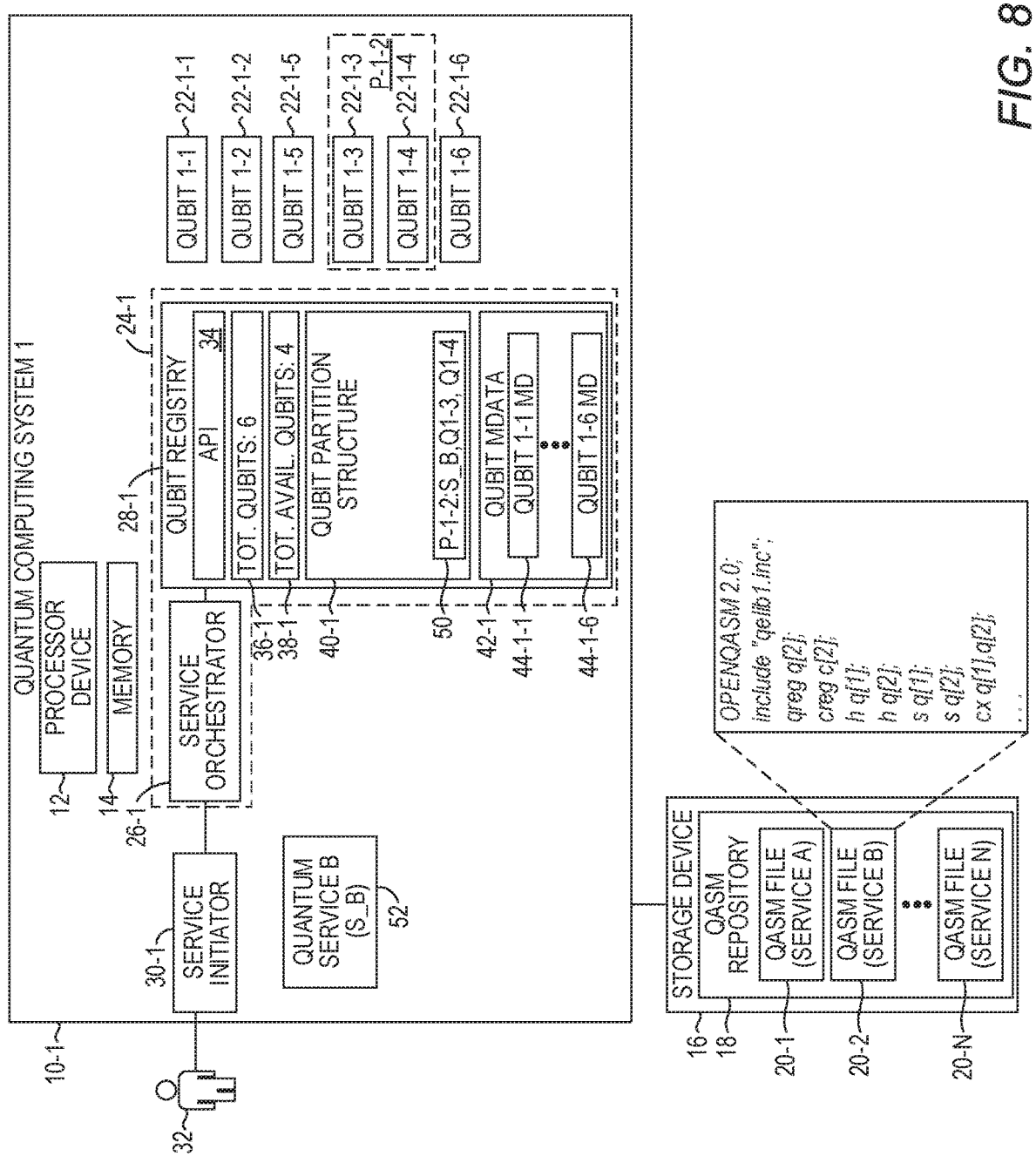
FIG. 8 is a block diagram of the quantum computing system at a subsequent point in time to that illustrated in FIG. 6, when the qubits associated with the quantum service can be reallocated to the pool of available qubits, according to one implementation.
Figure 9:
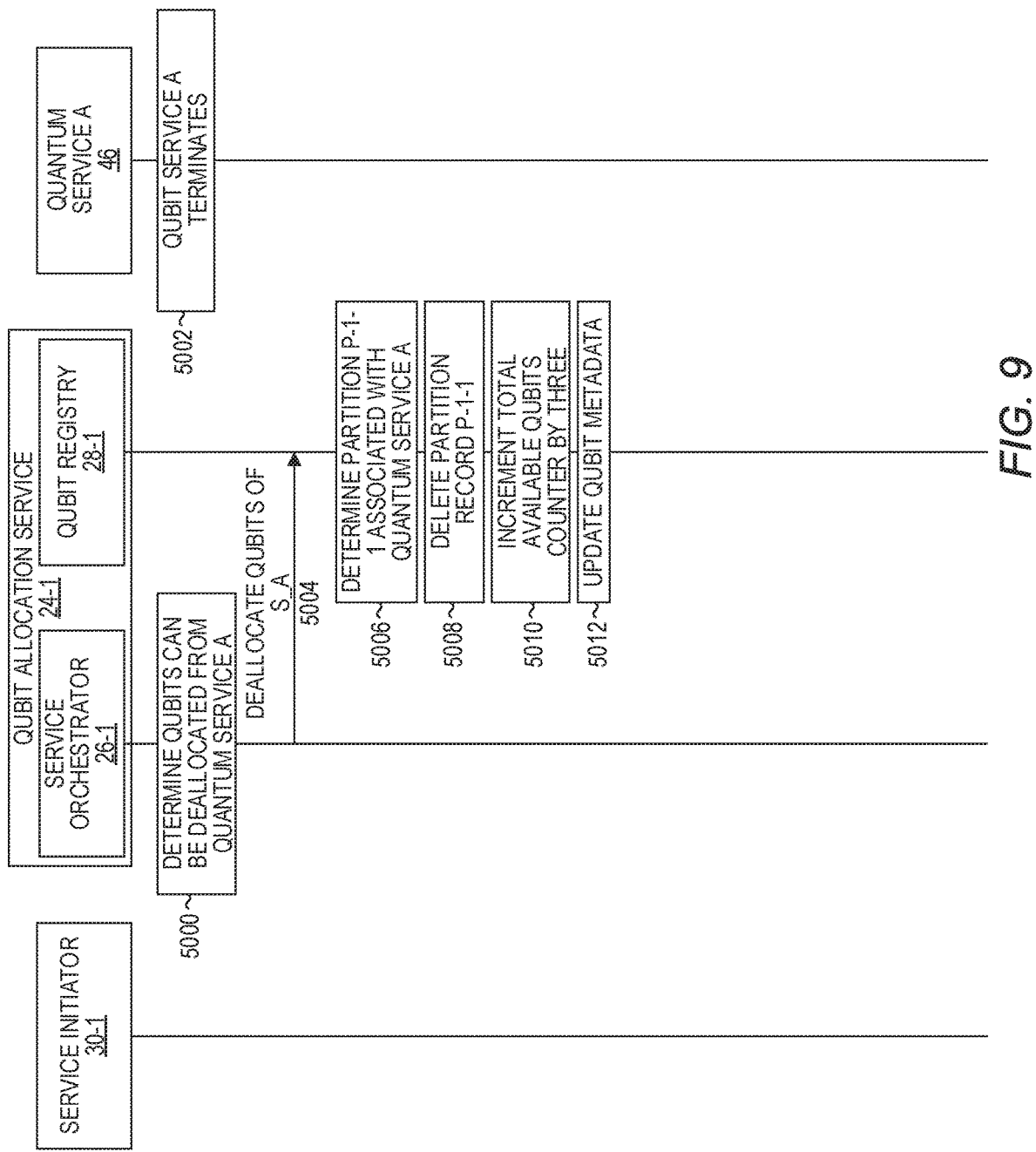
FIG. 9 is a message flow diagram illustrating an example message flow between components illustrated in FIG. 8 during the reallocation of the qubits, according to one implementation.

FIG. 8 is a block diagram of the quantum computing system 10-1 at a subsequent point in time to that illustrated in FIG. 6, when the qubits 22-1-1, 22-1-2, and 22-1-5 associated with the quantum service 46 can be reallocated to the pool of available qubits, according to one implementation. FIG. 9 is a message flow diagram illustrating an example message flow between components illustrated in FIG. 8 during the reallocation of the qubits 22-1-1, 22-1-2, and 22-1-5, according to one implementation. FIGS. 8 and 9 will be discussed in conjunction with one another. Referring first to FIG. 9, the service orchestrator 26-1 determines that the qubits 1-1, 1-2 and 1-5 can be deallocated from the quantum service 46, and can be reallocated to the pool of available qubits (FIG. 9, block 5000). The determination may be made in any of a number of different ways. In one example, the quantum service 46 may terminate (FIG. 9, block 5002). The service orchestrator 26-1 may receive an event indicating that the quantum service 46 has terminated. In another example, the quantum service 46 may send the service orchestrator 26-1 a deallocation message indicating that one or more of the qubits 22-1-1, 22-1-2, and 22-1-5 can be reallocated to the pool of available qubits.

The service orchestrator 26-1 sends a deallocation message to the qubit registry 28-1 indicating that the qubits associated with the quantum service 46 may be reallocated to the pool of available qubits (FIG. 9, block 5004). Although in this example all of the qubits associated with the quantum service 46 are being reallocated to the pool of available qubits, in other examples, where, for example, a quantum service determines that it no longer needs a particular qubit or qubits, only a subset of qubits associated with a quantum service may be reallocated to the pool of available qubits.

The qubit registry 28-1 receives the deallocation message and determines that the partition P-1-1 is associated with the quantum service 46 (FIG. 9, block 5006). The qubit registry 28-1 deletes the qubit partition record 48 to remove the qubits 22-1-1, 22-1-2, and 22-1-5 from the partition P-1-1 (FIG. 9, block 5008). The qubit registry 28-1 increments the total available qubits counter 38-1 by three (FIG. 9, block 5010). The qubit registry 28-1 updates the qubit metadata records that correspond to the qubits 22-1-1, 22-1-2, and 22-1-5 (FIG. 9, block 5012).

Figure 10:
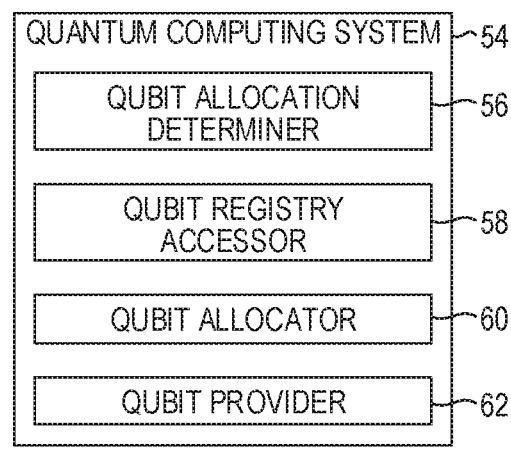
FIG. 10 is a block diagram of a quantum computing system according to another implementation.

FIG. 10 is a block diagram of a quantum computing system 54 according to another implementation. The quantum computing system 54 implements identical functionality as that described above with regard to the quantum computing system 10-1. The quantum computing system 54 includes a qubit allocation determiner 56 to determine that a first quantum service requires a qubit for execution. The qubit allocation determiner 56 may comprise executable software instructions configured to program a processor device to implement the functionality of determining that a first quantum service requires a qubit for execution, may comprise circuitry including, by way of non-limiting example, an application-specific integrated circuit (ASIC), field-programmable gate array (FPGA), or may comprise a combination of executable software instructions and circuitry.

The quantum computing system 54 also includes a qubit registry accessor 58 to access a qubit registry that maintains information about a plurality of qubits on a quantum computing system to identify a first qubit of the plurality of qubits that is available for allocation. In some implementations, the qubit registry accessor 58 accesses the qubit registry by interacting with the qubit registry via an interprocess communication mechanism, such as an API, or the like. In other implementations, such as where the qubit registry does not include functionality, the qubit registry accessor 58 accesses the qubit registry by reading and writing to the qubit registry. The qubit registry accessor 58 may comprise executable software instructions configured to program a processor device to implement the functionality of accessing a qubit registry that maintains information about a plurality of qubits on a quantum computing system to identify a first qubit of the plurality of qubits that is available, may comprise circuitry including, by way of non-limiting example, an ASIC, FPGA, or may comprise a combination of executable software instructions and circuitry.

The quantum computing system 54 also includes a qubit allocator 60 to store information indicating the first qubit is allocated to the first quantum service. The qubit allocator 60 may comprise executable software instructions to program a processor device to implement the functionality of storing information indicating the first qubit is allocated to the first quantum service, may comprise circuitry including, by way of non-limiting example, an ASIC, FPGA, or may comprise a combination of executable software instructions and circuitry.

The quantum computing system 54 also includes a qubit provider 62 to provide, to the first quantum service, qubit information via which the first quantum service can determine that the first qubit is allocated to the first quantum service. The qubit provider 62 may comprise executable software instructions to program a processor device to implement the functionality of providing, to the first quantum service, qubit information via which the first quantum service can determine that the first qubit is allocated to the first quantum service, may comprise circuitry including, by way of non-limiting example, an ASIC, FPGA, or may comprise a combination of executable software instructions and circuitry.

Figure 11:
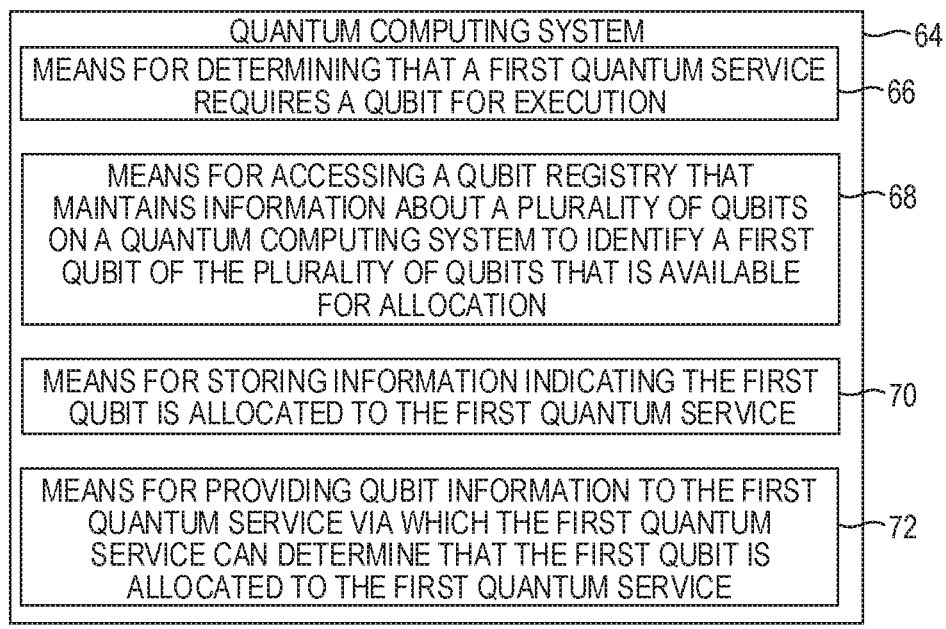
FIG. 11 is a block diagram of a quantum computing system according to another implementation.

FIG. 11 is a block diagram of a quantum computing system 64 according to additional implementations. The quantum computing system 64 implements identical functionality as that described above with regard to the quantum computing systems 10-1 and 54. In this implementation, the quantum computing system 64 includes a means 66 for determining, by a qubit allocation service, that a first quantum service requires a qubit for execution. The means 66 may be implemented in any number of manners, including, for example, via the qubit allocation determiner 56 illustrated in FIG. 10. The means 66 may, in some implementations, provide an application programming interface that may be invoked by a quantum computing service when the quantum computing service requires a qubit. The means 66 may also, as discussed above, access a QASM file that implements a quantum service to determine that the quantum service requires one or more qubits.

The quantum computing system 64 also includes a means 68 for accessing, by the qubit allocation service, a qubit registry that maintains information about a plurality of qubits on a quantum computing system to identify a first qubit of the plurality of qubits that is available for allocation. The means 68 may be implemented in any number of manners, including, for example, via the qubit registry accessor 58 illustrated in FIG. 10.

The quantum computing system 64 also includes a means 70 for storing information indicating the first qubit is allocated to the first quantum service. The means 70 may be implemented in any number of manners, including, for example, via the qubit allocator 60 illustrated in FIG. 10. The means 70, in some implementations, generates, or causes to be generated, a qubit partition that identifies the first qubit as being associated with a particular quantum service, and prevents the first qubit from being allocated to another quantum service.

The quantum computing system 64 also includes a means 72 for providing, to the first quantum service, qubit information via which the first quantum service can determine that the first qubit is allocated to the first quantum service. The means 72 may be implemented in any number of manners, including, for example, via the qubit provider 62 illustrated in FIG. 10.

Figure 12:
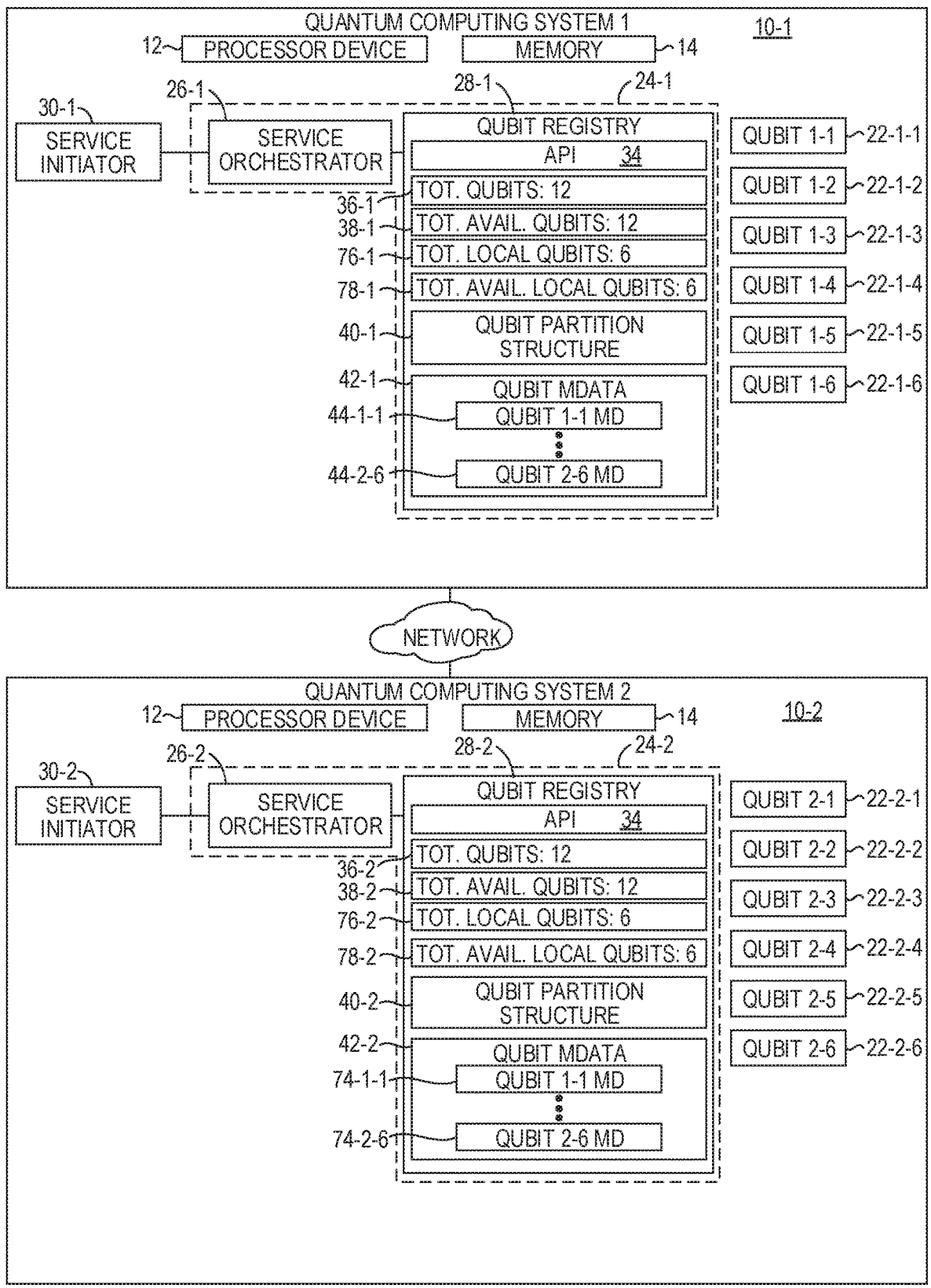
FIG. 12 is a block diagram of a distributed qubit allocation service according to one implementation.

FIG. 12 is a block diagram of a distributed qubit allocation service according to one implementation. The distributed qubit allocation service includes the qubit allocation service 24-1 implemented on the quantum computing system 10-1, and a qubit allocation service 24-2 implemented on a quantum computing system 10-2. The qubit allocation service 24-2 and the quantum computing system 10-2 operate substantially similarly to the qubit allocation service 24-1 and the quantum computing system 10-1 discussed above, except as otherwise discussed herein. While for purposes of illustration, the distributed qubit allocation service illustrates two qubit allocation services 24-1, 24-2, in practice, the distributed qubit allocation service may include any number of qubit allocation services.

The quantum computing system 10-2 implements six qubits 22-2-1-22-2-6. The qubit allocation services 24-1-24-2 communicate with one another via qubit update records to keep the qubit allocation services 24-1-24-2 synchronized with one another. Each qubit allocation service 24-1-24-2 is thus aware of the qubits implemented on both of the quantum computing systems 10-1-10-2, and can allocate and dellocate any of the sixteen qubits 22-1-1-22-2-6. The qubit allocation service 24-1 maintains the total qubits counter 36-1, which maintains track of the total number of qubits available over both the quantum computing systems 10-1 and 10-2, in this example, twelve qubits. The qubit allocation service 24-1 maintains the total available qubits counter 38-1 which maintains track of the total number of qubits on both the quantum computing systems 10-1 and 10-2 that are currently allocatable. At the point in time illustrated in FIG. 12, 12 qubits are allocatable. The qubit allocation service 24-1 maintains a total local qubits counter 76-1, which maintains track of the total number of qubits implemented locally on the quantum computing system 10-1, and maintains a total available local qubits counter 78-1 which maintains track of the number of local qubits that are available to be allocated.

The qubit allocation service 24-2 interacts with a service orchestrator 26-2, which in turn may interact with a service initiator 30-2. The qubit allocation service 24-2 includes a qubit registry 28-2, which maintains a total qubits counter 36-2, which maintains track of the total number of qubits available over both the quantum computing systems 10-1 and 10-2, in this example, twelve qubits. The qubit allocation service 24-2 maintains a total available qubits counter 38-2, which maintains track of the total number of qubits on both the quantum computing systems 10-1 and 10-2 that are currently allocatable. The qubit allocation service 24-2 maintains a total local qubits counter 76-2, which maintains track of the total number of qubits implemented locally on the quantum computing system 10-2, and maintains a total available local qubits counter 78-2 which maintains track of the number of local qubits that are available to be allocated.

The qubit registry 28-2 maintains a qubit partition structure 40-2, which maintains information about which qubits 22-1-1-22-2-6 are associated with which qubit partitions. The qubit registry 28-2 also maintains qubit metadata 42-2, which comprises a plurality of metadata records 74-1-1-74-2-6, each of which maintains information about a corresponding qubit 22-1-1-22-2-6, such as, by way of non-limiting example, an identifier of the corresponding qubit 22-1-1-22-2-6, a quantum service identifier of the quantum service currently using the corresponding qubit 22-1-1-22-2-6, whether the corresponding qubit 22-1-1-22-2-6 is currently in an entangled state, or the like.

Figure 13:
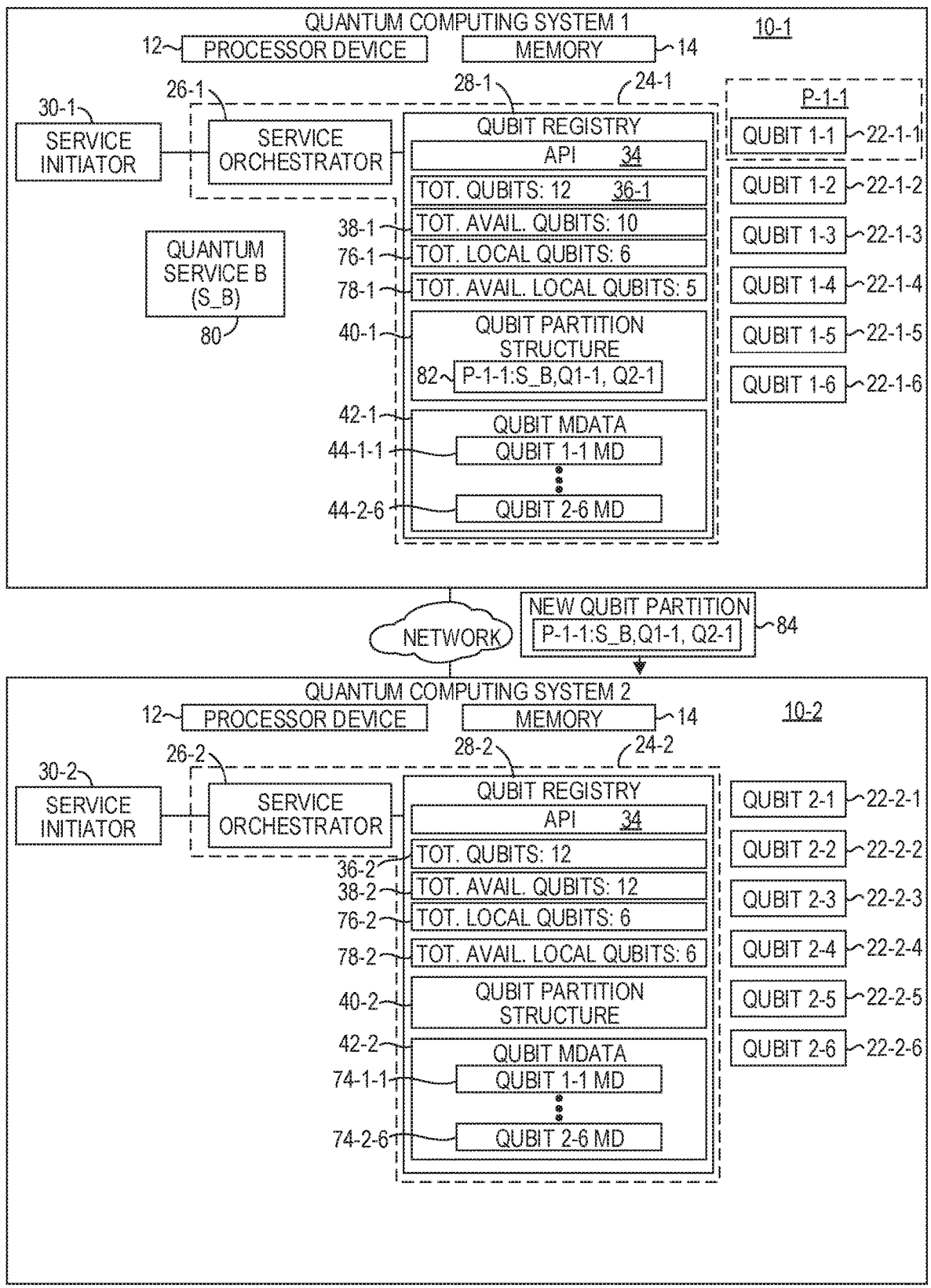
FIG. 13 is a block diagram of the distributed qubit allocation service illustrated in FIG. 12 at a subsequent point in time that illustrates the transmission of a qubit update record, according to one implementation.

FIG. 13 is a block diagram of the distributed qubit allocation service illustrated in FIG. 12 at a subsequent point in time, according to one implementation. For purposes of illustration, assume that the service initiator 30-1 requests that the service orchestrator 26-1 initates the quantum service B implemented by the QASM file 20-2 (FIG. 1). The service orchestrator 26-1 accesses the QASM file 20-2. The service orchestrator 26-1 parses the respective QASM file 20-2 in accordance with a QASM programming language syntax. The service orchestrator 26-1 determines, via the analysis of the QASM file 20-2, that two qubits are needed by the quantum service B.

The service orchestrator 26-1 accesses the qubit registry 28-1, and identifies the qubit 22-1-1 on the quantum computing system 10-1 and the qubit 22-2-1 on the quantum computing system 10-2 as being available for allocation to the quantum service B. This determination may be made, for example, by accessing the qubit partition structure 40-1, or the qubit metadata 42-1, and determining that the qubits 22-1-1 and 22-2-1 are currently unallocated. The qubit registry 28-1 generates a new qubit partition record 82 to generate a new partition P-1-1 that includes the qubits 22-1-1 and 22-2-1. The qubit registry 28-1 decrements the total available qubits counter 38-1 by two. The qubit registry 28-1 decrements the total available local qubits counter 78-1 by one. The qubit registry 28-1 updates the metadata records 44-1-1 and 44-2-1 to indicate that the qubits 22-1-1 and 22-2-1 are currently allocated to the quantum service B and are in partition P-1-1. The service orchestrator 26-1 then initiates a quantum service 80 (quantum service B) from the QASM file 20-2, and provides qubit information via which the quantum service 80 can determine that the qubits 22-1-1 and 22-2-1 have been allocated to the quantum service 80. In some implementations, the qubit information may include the qubit partition identifier and the qubit identifiers. In other implementations, the qubit information may include only the partition identifier, and the quantum service 80 may then query the qubit registry 28-1 directly to obtain the qubit identifiers that identify the qubits 22-1-1 and 22-2-1.

The qubit allocation service 24-1 then generates a qubit update record 84 that identifies the new qubit partition P-1-1, and the qubit 22-1-1 and the qubit 22-2-1 as being allocated to the quantum service 80. The qubit allocation service 24-1 sends the qubit update record 84 to the qubit allocation service 24-2.

Figure 14:
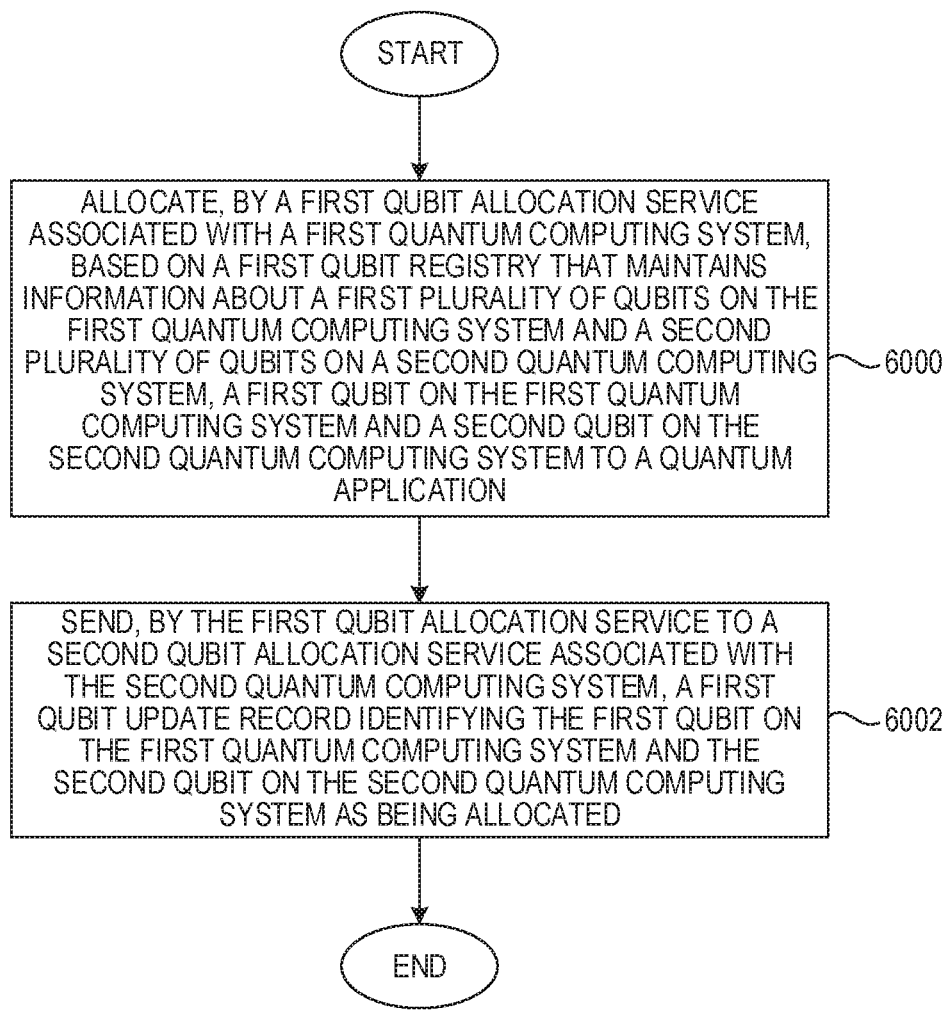
FIG. 14 is a flowchart of a method for distributed qubit allocation according to one implementation.

FIG. 14 is a flowchart of a method for distributed qubit allocation according to one implementation. FIG. 14 will be discussed in conjunction with FIG. 13. The qubit allocation service 24-1 allocates, based on the qubit registry 28-1 that maintains information about the qubits 22-1-1-22-1-6 on the quantum computing system 10-1 and the qubits 22-2-1-22-2-6 on the quantum computing system 10-2, the qubit 22-1-1 on the quantum computing system 10-1 and the qubit 22-2-1 on the quantum computing system 10-2 to the quantum service B (FIG. 14, block 6000). The qubit allocation service 24-1 sends, to the qubit allocation service 24-2 associated with the quantum computing system 10-2, the qubit update record 84 identifying the qubits 22-1-1 and 22-2-1 as being allocated (FIG. 14, block 6002).

Figure 15:
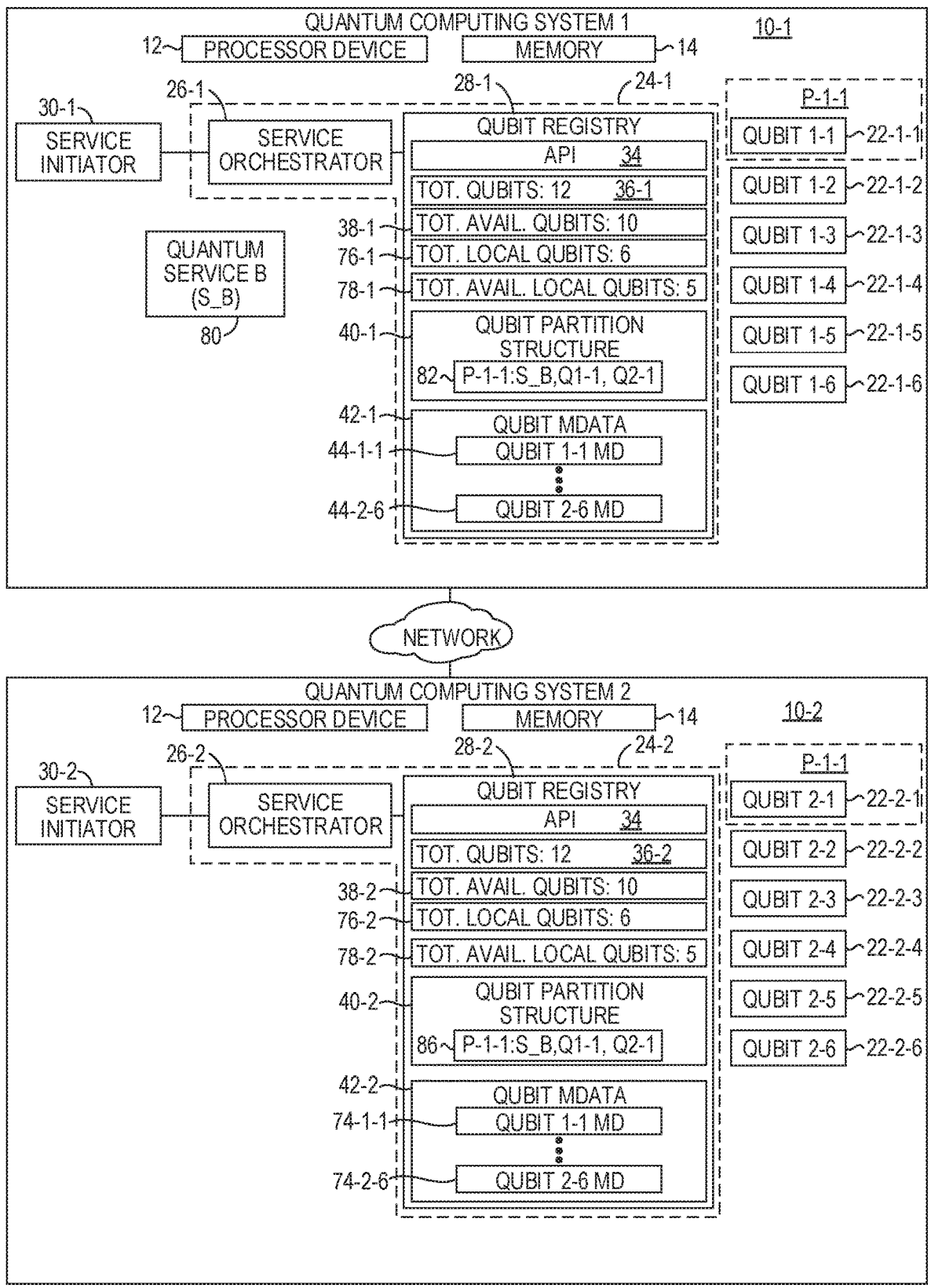
FIG. 15 is a block diagram of the distributed qubit allocation service illustrated in FIG. 13 after a qubit allocation service has received a qubit update record, according to one implementation.

FIG. 15 is a block diagram of the distributed qubit allocation service illustrated in FIG. 13 after the qubit allocation service 24-2 has received the qubit update record 84. In response to receiving the qubit update record 84, the qubit allocation service 24-2 generates a new qubit partition record 86 that includes the qubits 22-1-1 and 22-2-1. The qubit allocation service 24-2 decrements the total available qubits counter 38-2 by two. The qubit allocation service 24-2 decrements the total available local qubits counter 78-2 by one. The qubit allocation service 24-2 updates the metadata records 74-1-1 and 74-2-1 to indicate that the qubits 22-1-1 and 22-2-1 are currently allocated to the quantum service B and are in partition P-1-1.

Figure 16:
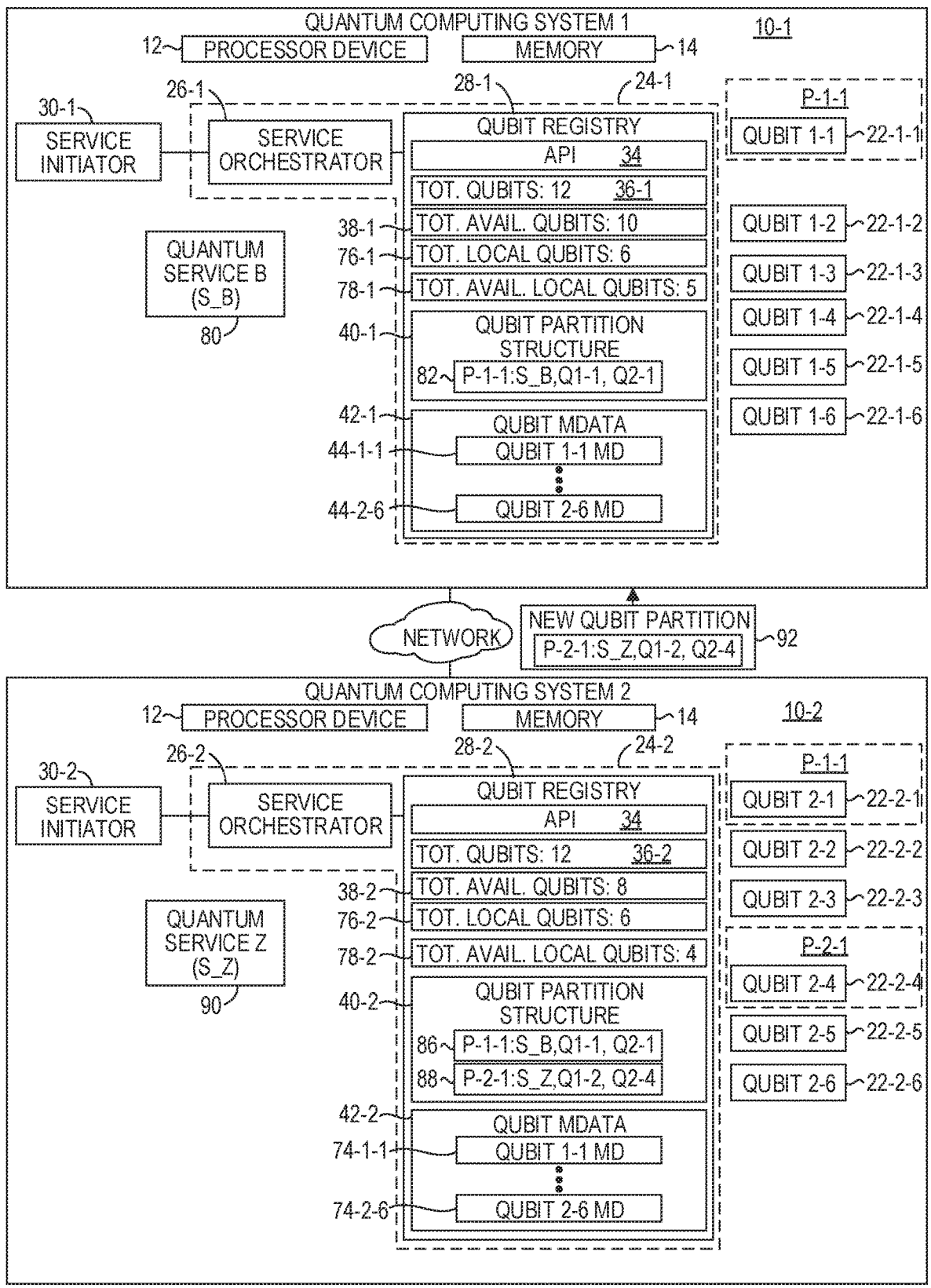
FIG. 16 is a block diagram of the distributed qubit allocation service illustrated in FIG. 15 at a subsquent point in time to that illustrated in FIG. 15, illustrating the transmission of a second qubit update record, according to one implementation.

FIG. 16 is a block diagram of the distributed qubit allocation service illustrated in FIG. 15 at a subsequent point in time to that illustrated in FIG. 15. Assume that the service initiator 30-2 requests that the service orchestrator 26-2 initates a quantum service Z implemented by a QASM file (not illustrated). The service orchestrator 26-2 accesses the corresponding QASM file, and parses the QASM file in accordance with a QASM programming language syntax. The service orchestrator 26-2 determines, via the analysis of the QASM file, that two qubits are needed by the quantum service Z.

The service orchestrator 26-2 accesses the qubit registry 28-2, and identifies the qubits 22-1-2 on the quantum computing system 10-1 and the qubit 22-2-4 on the quantum computing system 10-2 as being available for allocation to the quantum service Z. The qubit registry 28-2 generates a new qubit partition record 88 to generate a new partition P-2-1 that includes the qubits 22-1-2 and 22-2-4. The qubit registry 28-2 decrements the total available qubits counter 38-2 by two. The qubit registry 28-2 decrements the total available local qubits counter 78-2 by one. The qubit registry 28-2 updates the metadata records 74-1-2 and 74-2-4 to indicate that the qubits 22-1-2 and 22-2-4 are currently allocated to the quantum service Z and are in partition P-2-1. The service orchestrator 26-2 then initiates a quantum service 90 (quantum service Z) from the corresponding QASM file, and provides qubit information via which the quantum service 90 can determine that the qubits 22-1-2 and 22-2-4 have been allocated to the quantum service 90.

The qubit allocation service 24-2 then generates a qubit update record 92 that identifies the new qubit partition P-2-1, the qubit 22-1-2 and the qubit 22-2-4 as being allocated to the quantum service 90. The qubit allocation service 24-2 sends the qubit update record 92 to the qubit allocation service 24-1.

Figure 17:
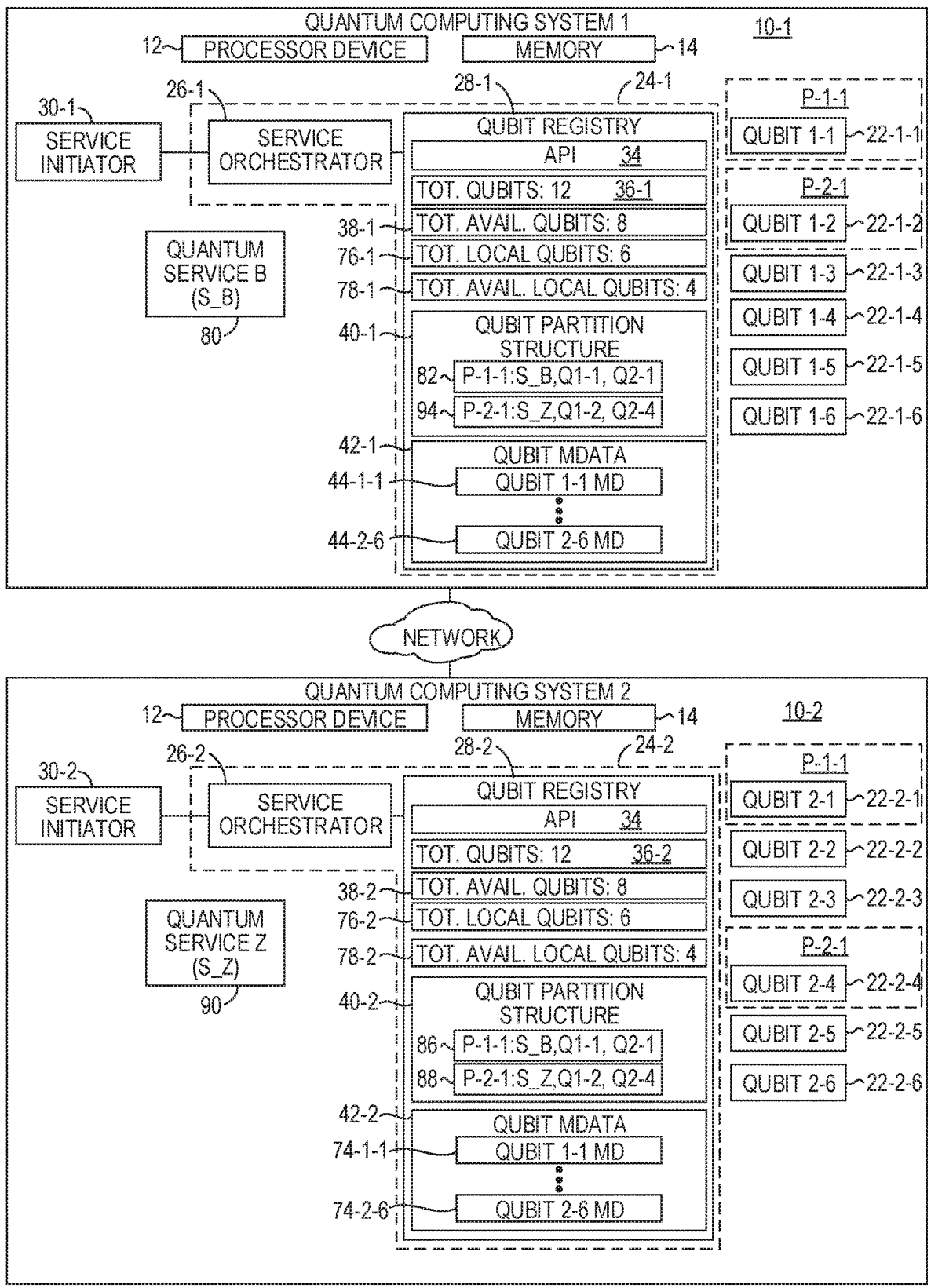
FIG. 17 is a block diagram of the distributed qubit allocation service illustrated in FIG. 16 after the qubit allocation service has received the qubit update record, according to one implementation.

FIG. 17 is a block diagram of the distributed qubit allocation service illustrated in FIG. 16 after the qubit allocation service 24-1 has received the qubit update record 92. In response to receiving the qubit update record 92, the qubit allocation service 24-1 generates a new qubit partition record 94 that includes the qubits 22-1-2 and 22-2-4. The qubit allocation service 24-1 decrements the total available qubits counter 38-1 by two. The qubit allocation service 24-1 decrements the total available local qubits counter 78-1 by one. The qubit allocation service 24-1 updates the metadata records 74-1-2 and 74-2-4 to indicate that the qubits 22-1-2 and 22-2-4 are currently allocated to the quantum service Z and are in partition P-2-1.

Figure 18:
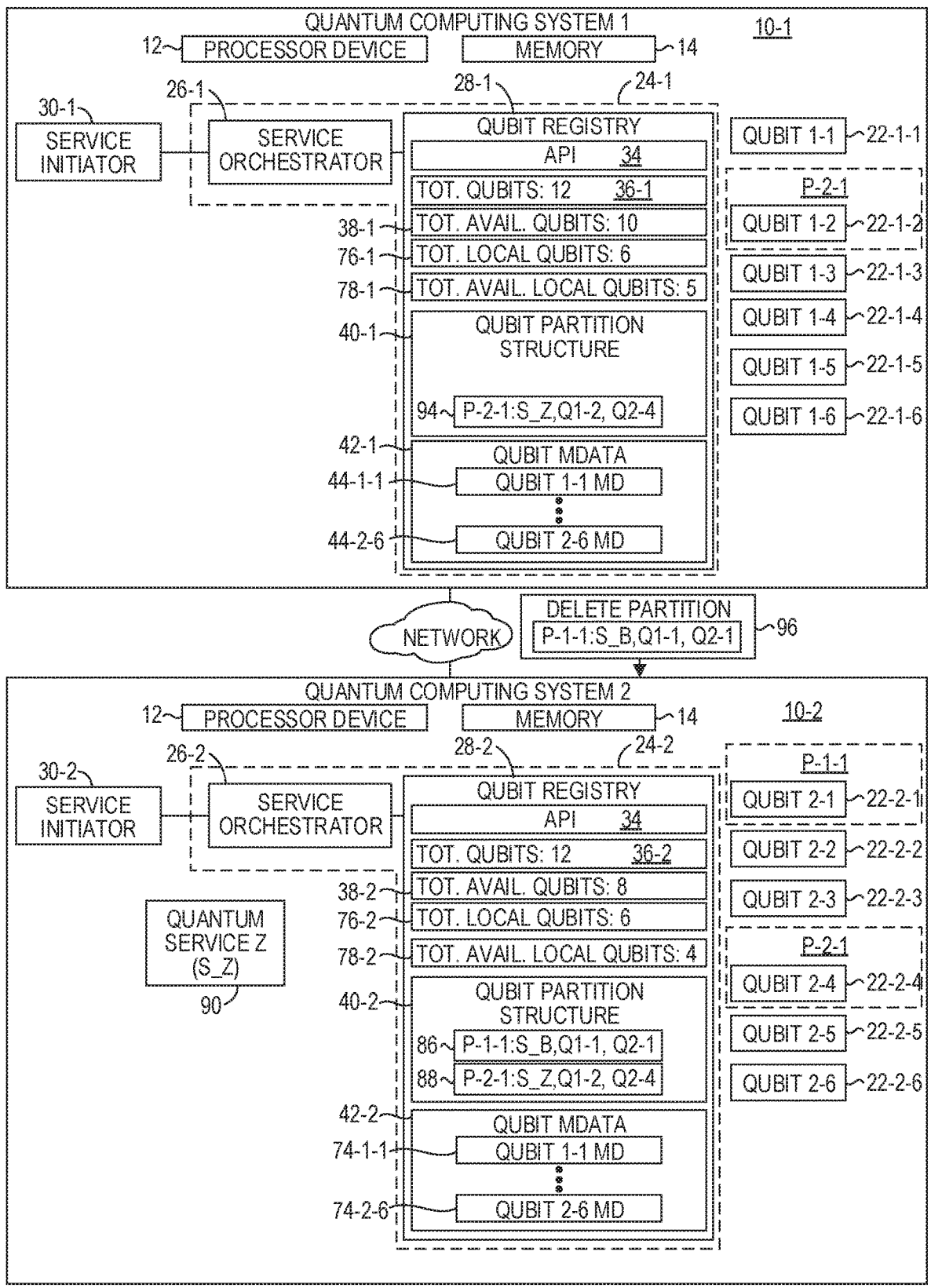
FIG. 18 is a block diagram of the distributed qubit allocation service illustrated in FIG. 17 at a subsequent point in time to that illustrated in FIG. 17 illustrating a qubit update record that identifies the deletion of a partition, according to one implementation.

FIG. 18 is a block diagram of the distributed qubit allocation service illustrated in FIG. 17 at a subsequent point in time to that illustrated in FIG. 17. Assume that the quantum service 80 terminates. The service orchestrator 26-1 sends a deallocation message to the qubit registry 28-1 indicating that the qubits associated with the quantum service 80 may be reallocated to the pool of available qubits. The qubit registry 28-1 receives the deallocation message and determines that the partition P-1-1 is associated with the quantum service 80. The qubit registry 28-1 deletes the qubit partition record 82 to remove the qubits 22-1-1 and 22-2-1 from the partition P-1-1. The qubit registry 28-1 increments the total available qubits counter 38-1 by two and the total available local qubits counter 78-1 by one. The qubit registry 28-1 updates the qubit metadata records 44-1-1 and 44-2-1 that correspond to the qubits 22-1-1 and 22-2-1. The qubit allocation service 24-1 then generates a qubit update record 96 that identifies the qubit partition P-1-1 as being deleted, and sends the qubit update record 96 to the qubit allocation service 24-2.

Figure 19:
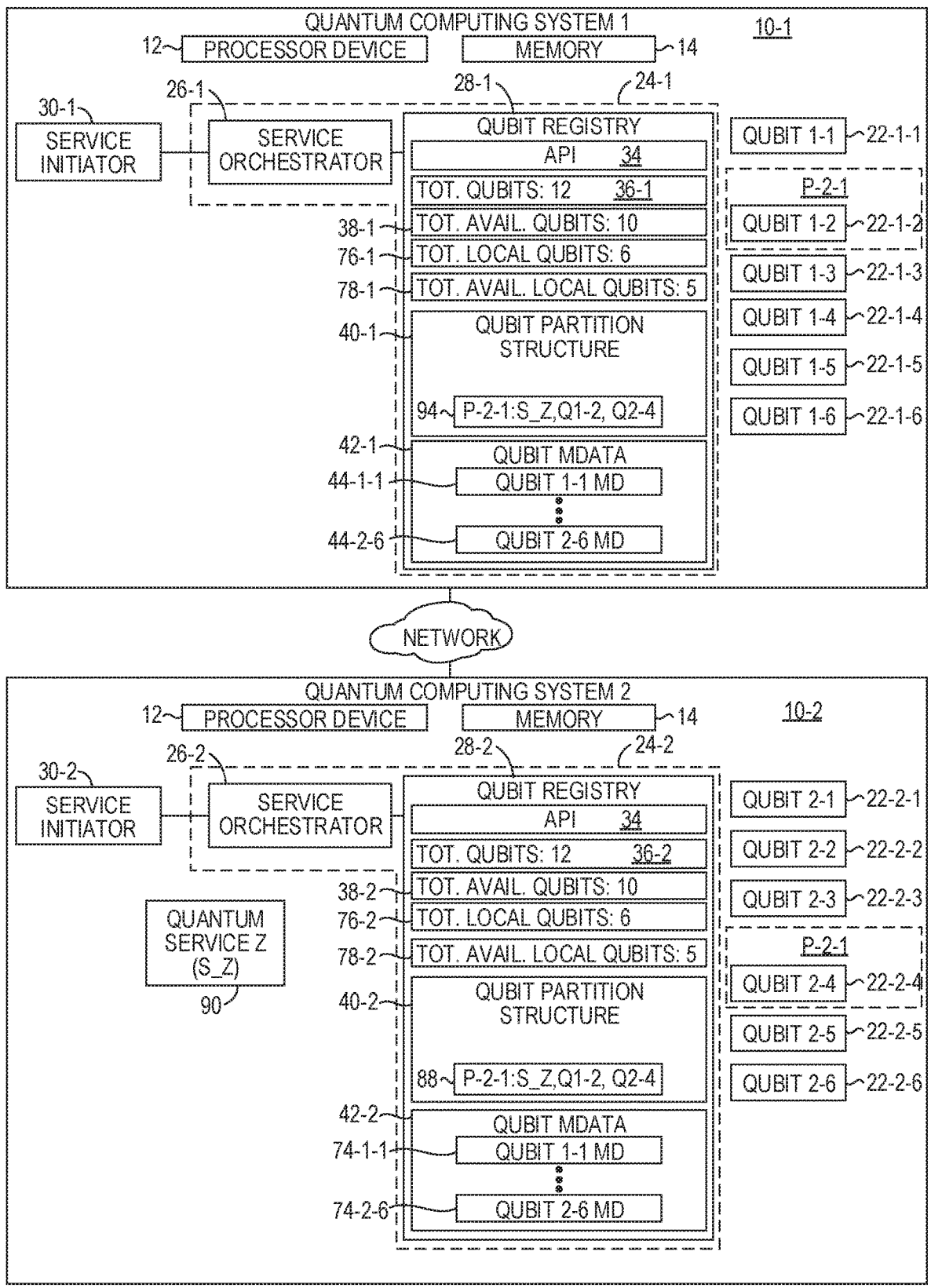
FIG. 19 is a block diagram of the distributed qubit allocation service illustrated in FIG. 18 after the qubit allocation service has received the qubit update record, according to one implementation.

FIG. 19 is a block diagram of the distributed qubit allocation service illustrated in FIG. 18 after the qubit allocation service 24-2 has received the qubit update record 96. In response to receiving the qubit update record 96, the qubit allocation service 24-2 deletes the qubit partition record 86, thereby reallocating the qubits 22-1-1 and 22-2-1 to the pool of available qubits. The qubit allocation service 24-2 increments the total available qubits counter 38-2 by two. The qubit allocation service 24-2 increments the total available local qubits counter 78-2 by one. The qubit allocation service 24-2 updates the metadata records 74-1-1 and 74-2-1 to indicate that the qubits 22-1-1 and 22-2-1 are reallocated to the pool of available qubits.

Figure 20:
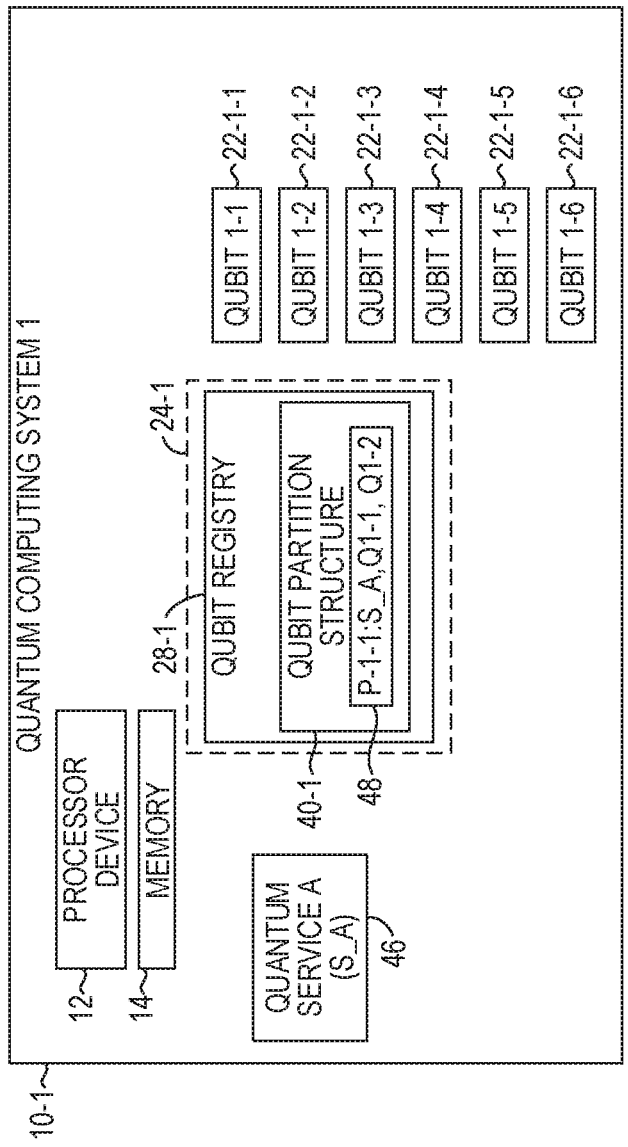
FIG. 20 is a simplified block diagram of the qubit allocation service illustrated in FIG. 1, according to one implementation.

FIG. 20 is a simplified block diagram of the quantum computing system 10-1 illustrated in FIG. 1, according to one implementation. The quantum computing system 10-1 includes the processor device 12 and the memory 14. The qubit allocation service 24-1 determines that the quantum service 46 requires a qubit. The qubit allocation service 24-1 accesses the qubit registry 28-1 that maintains information about the plurality of qubits 22-1-1-22-1-6 on the quantum computing system 10-1 to identify the qubit 22-1-1 as being available for allocation. The qubit allocation service 24-1 stores information indicating the qubit 22-1-1 is allocated to the quantum service 46, and provides, to the quantum service 46, an identifier via which the quantum service 46 can determine that the qubit 22-1-1 is allocated to the quantum service 46.

Figure 21:
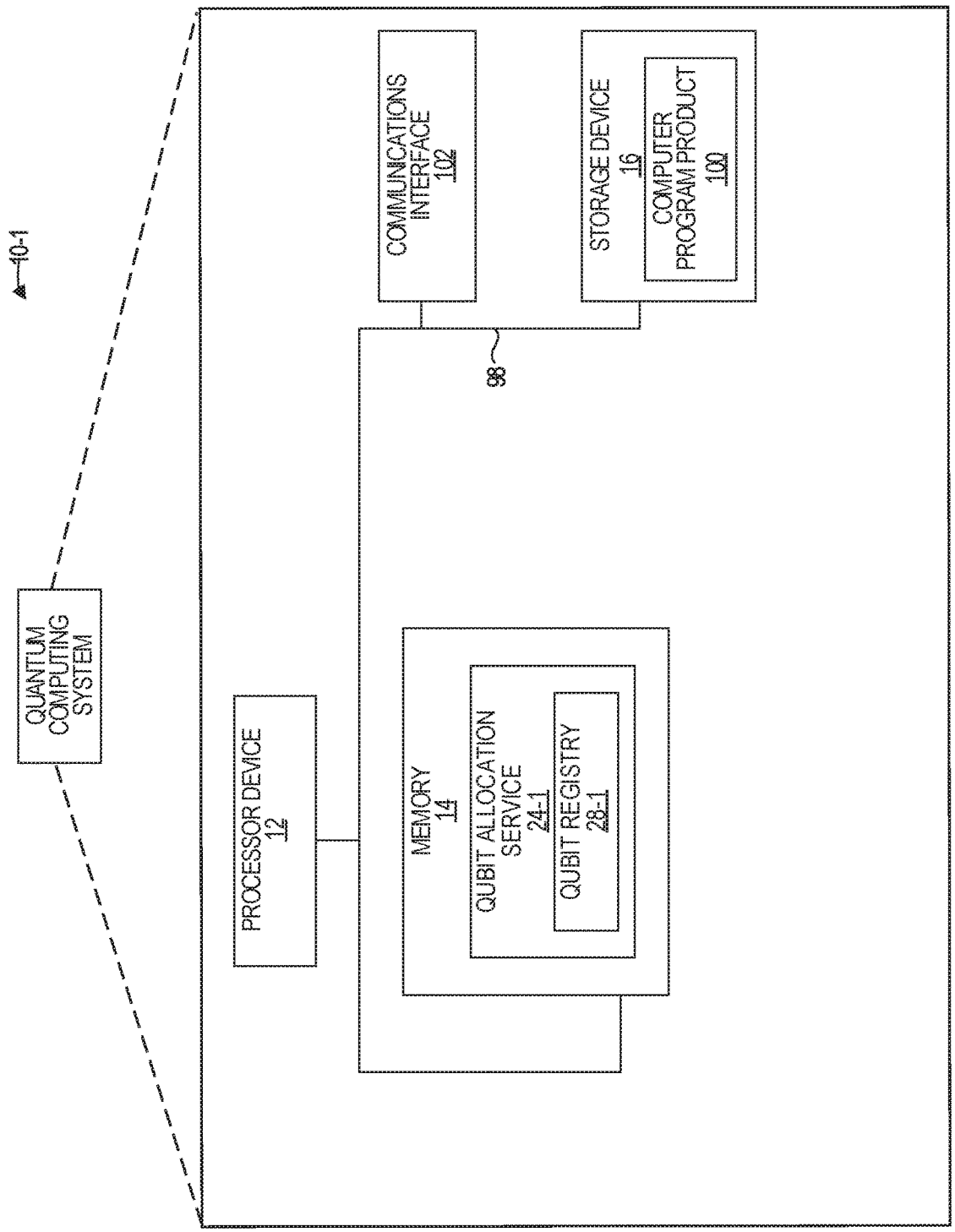
FIG. 21 is a block diagram of a quantum computing system suitable for implementing examples disclosed herein according to one example.

FIG. 21 is a block diagram of the quantum computing system 10-1 suitable for implementing examples according to one example. The quantum computing system 10-1 may comprise any computing or electronic device capable of including firmware, hardware, and/or executing software instructions to implement the functionality described herein in a quantum environment. The quantum computing system 10-1 includes the one or more processor devices 12, the one or more memories 14 and a system bus 98. The system bus 98 provides an interface for system components including, but not limited to, the one or more memories 14 and the one or more processor devices 12. The processor devices 12 can be any commercially available or proprietary processor suitable for operating in a quantum environment. The quantum computing system 10-1 may further include or be coupled to a non-transitory computer-readable storage medium such as the storage device 16. The storage device 16 and other drives associated with computer-readable media and computer-usable media may provide non-volatile storage of data, data structures, computer-executable instructions, and the like.

A number of modules can be stored in the storage device 16 and in the memory 14, including the qubit allocation service 24-1 and the qubit registry 28-1. In some implementations, all or a portion of the qubit registry 28-1 may be maintained on the storage device 16, in the memory 14, or both. All or a portion of the examples may be implemented as a computer program product 100 stored on a transitory or non-transitory computer-usable or computer-readable storage medium, such as the storage device 16, which includes complex programming instructions, such as complex computer-readable program code, to cause the one or more processor devices 12 to carry out the steps described herein. Thus, the computer-readable program code can comprise software instructions for implementing the functionality of the examples described herein when executed on the one or more processor devices 12.

An operator, such as the operator 32, may also be able to enter one or more configuration commands through a keyboard (not illustrated), a pointing device such as a mouse (not illustrated), or a touch-sensitive surface (not illustrated). The quantum computing system 10-1 may also include a communications interface 102 suitable for communicating with other computing devices, including, in some implementations, classical computing devices.

Other computer system designs and configurations may also be suitable to implement the systems and methods described herein. The following examples illustrate various additional implementations in accordance with one or more aspects of the disclosure.

Example 1 is a method that includes allocating, by a first qubit allocation service associated with a first quantum computing system, based on a first qubit registry that maintains information about a first plurality of qubits on the first quantum computing system and a second plurality of qubits on a second quantum computing system, a first qubit on the first quantum computing system and a second qubit on the second quantum computing system to a quantum application; and sending, by the first qubit allocation service to a second qubit allocation service associated with the second quantum system, a first qubit update record identifying the first qubit on the first quantum computing system and the second qubit on the second quantum computing system as being allocated.

Example 2 is the method of example 1, further including, based on allocating the first qubit and the second qubit, decrementing by two, by the first qubit allocation service, a total available qubits counter that identifies a total number of qubits available on the first quantum computing system and the second quantum computing system.

Example 3 is the method of example 2, further including, based on allocating the first qubit and the second qubit, decrementing by one, by the first qubit allocation service, a local available qubits counter that identifies a total number of qubits available on the first quantum computing system.

Example 4 is the method of example 1, further including receiving, by the first qubit allocation service from the second qubit allocation service, a second qubit update record identifying a third qubit on the first quantum computing system as being allocated; and, in response to receiving the second qubit update record, decrementing by one, by the first qubit allocation service, a total available qubits counter that identifies a total number of qubits available on the first quantum computing system and the second quantum computing system.

Example 5 is the method of example 4, further including, in response to receiving the second qubit update record, decrementing by one, by the first qubit allocation service, a local available qubits counter that identifies a total number of qubits available on the first quantum computing system.

Example 6 is the method of example 1, further including determining, by the first qubit allocation service, that the quantum application no longer requires the first qubit and the second qubit; and sending, by the first qubit allocation service to the second qubit allocation service associated with the second quantum computing system, a second qubit update record identifying the first qubit on the first quantum computing system and the second qubit on the second quantum computing system as being available for allocation.

Example 7 is the method of example 6, further including, in response to determining, by the first qubit allocation service, that the quantum application no longer requires the first qubit and the second qubit: incrementing by two, by the first qubit allocation service, a total available qubits counter that identifies a total number of qubits available on the first quantum computing system and the second quantum computing system; and incrementing by one, by the first qubit allocation service, a local available qubits counter that identifies a total number of qubits available on the first quantum computing system.

Example 8 is a computing system, including one or more processor devices to allocate, by a first qubit allocation service associated with a first quantum computing system, based on a first qubit registry that maintains information about a first plurality of qubits on the first quantum computing system and a second plurality of qubits on a second quantum computing system, a first qubit on the first quantum computing system and a second qubit on the second quantum computing system to a quantum application; and send, by the first qubit allocation service to a second qubit allocation service associated with the second quantum computing system, a first qubit update record identifying the first qubit on the first quantum computing system and the second qubit on the second quantum computing system as being allocated.

Example 9 is the computing system of example 8, wherein the one or more processor devices are further to receive, by the first qubit allocation service from the second qubit allocation service, a second qubit update record identifying a third qubit on the first quantum computing system as being allocated; and, in response to receiving the second qubit update record, decrement by one, by the first qubit allocation service, a total available qubits counter that identifies a total number of qubits available on the first quantum computing system and the second quantum computing system.

Example 10 is the computing system of example 8, wherein the one or more processor devices are further to determine, by the first qubit allocation service, that the quantum application no longer requires the first qubit and the second qubit; and send, by the first qubit allocation service to the second qubit allocation service associated with the second quantum computing system, a second qubit update record identifying the first qubit on the first quantum computing system and the second qubit on the second quantum computing system as being available for allocation.

Example 11 is a quantum computing system that includes means for determining, by a qubit allocation service, that a first quantum service requires a qubit for execution; means for accessing, by the qubit allocation service, a qubit registry that maintains information about a plurality of qubits on a quantum computing system to identify a first qubit of the plurality of qubits that is available for allocation; means for storing information indicating the first qubit is allocated to the first quantum service; and means for providing, to the first quantum service, qubit information via which the first quantum service can determine that the first qubit is allocated to the first quantum service.

Example 12 is a quantum computing system that includes a qubit allocation determiner to determine that a first quantum service requires a qubit for execution; a qubit registry accessor to access a qubit registry that maintains information about a plurality of qubits on a quantum computing system to identify a first qubit of the plurality of qubits that is available for allocation; a qubit allocator to store information indicating the first qubit is allocated to the first quantum service; and a qubit provider to provide, to the first quantum service, qubit information via which the first quantum service can determine that the first qubit is allocated to the first quantum service.

Example 13 is a method that includes receiving, by a quantum registry from a requestor, a request to allocate a qubit to a quantum service; accessing, by the quantum registry, qubit information that identifies a first qubit of a plurality of qubits implemented by a quantum computing system as being available for allocation to the quantum service; storing, by the quantum registry, information that indicates the first qubit is allocated to the quantum service and is not available for allocation to any other quantum service; and sending, to the requestor, information via which the quantum service can determine that the first qubit has been allocated to the first quantum service.

Example 14 is the method of example 13 wherein the information via which the quantum service can determine that the first qubit has been allocated to the first quantum service includes a qubit identifier that identifies the first qubit.

Example 15 is the method of example 13 wherein accessing, by the quantum registry, the qubit information that identifies the first qubit of the plurality of qubits implemented by the quantum computing system as being available for allocation to the quantum service includes accessing a qubit partition structure that identifies one or more qubit partitions, and determining that the first qubit is not currently in a qubit partition.

Example 16 is the method of example 15 wherein the information via which the quantum service can determine that the first qubit has been allocated to the first quantum service includes a partition identifier of a qubit partition that has been allocated to the first quantum service.

Example 17 is a quantum computing system that includes a memory, and a processor device coupled to the memory, the processor device to receive, by a quantum registry from a requestor, a request to allocate a qubit to a quantum service; access, by the quantum registry, qubit information that identifies a first qubit of a plurality of qubits implemented by a quantum computing system as being available for allocation to the quantum service; store, by the quantum registry, information that indicates the first qubit is allocated to the quantum service and is not available for allocation to any other quantum service; and send, to the requestor, information via which the quantum service can determine that the first qubit has been allocated to the quantum service.

Example 18 is the quantum computing system of example 17 wherein to access, by the quantum registry, the qubit information that identifies the first qubit of the plurality of qubits implemented by the quantum computing system as being available for allocation to the quantum service, the processor device is further to access a qubit partition structure that identifies one or more qubit partitions, and determine that the first qubit is not currently in a qubit partition.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a qubit allocation service, that a first quantum service requires a qubit for execution by:
   analyzing, by the qubit allocation service, a quantum assembly file (QASM) file that implements the first quantum service; and
   determining, based on the QASM file, that the first quantum service requires the qubit for execution;
   in response to determining that the first quantum service requires the qubit for execution, accessing, by the qubit allocation service, a qubit registry that maintains information about a plurality of qubits on a quantum computing system to identify a first qubit of the plurality of qubits that is available for allocation;
   storing information indicating the first qubit is allocated to the first quantum service;
   in response to the first qubit being allocated to the first quantum service, decrementing an integer value that is classically stored in a total available qubits counter of the qubit registry service by an integer of value one, wherein the decremented integer value stored in the total available qubits counter is an integer value indicating a total number of qubits that are currently available for allocation and the total available qubits counter is a classical counter; and
   providing, by the qubit allocation service to the first quantum service, qubit information via which the first quantum service is enabled to determine that the first qubit is allocated to the first quantum service.

2. The method of claim 1 wherein determining, by the qubit allocation service, that the first quantum service requires the qubit for execution comprises receiving, by a quantum service orchestrator of the qubit allocation service, from the first quantum service, a request for the qubit to be allocated.

3. The method of claim 1 further comprising:
   obtaining, from the qubit registry, a qubit identifier that identifies the first qubit; and
   wherein providing, by the qubit allocation service to the first quantum service, the qubit information via which the first qubit is allocated to the first quantum service comprises:
   initiating, by the quantum service orchestrator of the qubit allocation service, the first quantum service; and
   providing, to the first quantum service, the qubit information.

4. The method of claim 1 further comprising:
   generating, by the qubit allocation service, a first qubit partition that includes the first qubit; and
   associating the first qubit partition with the first quantum service.

5. The method of claim 4 wherein the qubit information comprises a first qubit partition identifier that identifies the first qubit partition.

6. The method of claim 4 wherein the qubit information comprises a qubit identifier that identifies the first qubit.

7. The method of claim 4 wherein generating, by the qubit allocation service, the first qubit partition that includes the first qubit further comprises:
   receiving, by the qubit registry from a quantum service orchestrator of the qubit allocation service, a first quantum service identifier that identifies the first quantum service;
   generating, by the qubit registry, the first qubit partition that includes the first qubit; and
   sending, to the quantum service orchestrator, a first qubit partition identifier that identifies the first qubit partition.

8. The method of claim 4 further comprising:
receiving, by the qubit registry, a request from the first quantum service requesting a total number of qubits available to the first quantum service;
accessing, by the qubit registry, the first qubit partition;
determining that the first qubit partition includes the first qubit; and
sending, to the first quantum service, information identifying that a total of one qubit is available to the second quantum service.

9. The method of claim 4 further comprising:
subsequent to providing, by the qubit allocation service to the first quantum service, the qubit information, receiving, by the qubit allocation service from the first quantum service, a request for a second qubit;
accessing, by the qubit allocation service, the qubit registry to identify a second qubit of the plurality of qubits that is available for allocation;
modifying a first partition record to identify the first qubit and the second qubit as being associated with the first qubit partition; and
providing, by the qubit allocation service to the first quantum service, qubit information via which the first quantum service is enabled to determine that the second qubit is allocated to the first quantum service.

10. The method of claim 1 further comprising:
determining, by the qubit allocation service, that the first quantum service has terminated;
reallocating the first qubit so that the first qubit is available for allocation; and
in response to reallocating the first qubit, incrementing the integer value indicating the total available qubits counter by the integer of one.

11. The method of claim 10 wherein reallocating the first qubit comprises deleting a first qubit partition that includes the first qubit.

12. The method of claim 1 further comprising:
receiving, by the qubit registry, a request from a second quantum service requesting a total number of qubits available to the second quantum service;
determining, by the qubit registry, that no qubit partition is associated with the second quantum service; and
sending, to the second quantum service, information identifying that a total of zero qubits are available to the second quantum service.

13. The method of claim 12 further comprising:
subsequent to receiving, by the qubit registry, the request from the second quantum service requesting the total number of qubits available to the second quantum service, receiving, from the qubit allocation service, from the second quantum service, a request for two qubits;
accessing, by the qubit allocation service, the qubit registry to identify a second qubit and a third qubit that is available for allocation;
generating, by the qubit allocation service, a second qubit partition that includes the second qubit and the third qubit;
associating the second qubit partition with the second quantum service; and
providing, by the qubit allocation service to the second quantum service, qubit information via which the second quantum service can determine that the second qubit and the third qubit are allocated to the second quantum service.

14. The method of claim 13 further comprising:
receiving, by the qubit registry, a second request from the second quantum service requesting the total number of qubits available to the second quantum service;
accessing, by the qubit registry, the second qubit partition;
determining that the second qubit partition includes the second qubit and the third qubit;
sending, to the second quantum service, information identifying that a total of two qubits are available to the second quantum service;
determining, by the qubit registry, that no qubit partition is associated with the second quantum service; and
sending, to the second quantum service, information identifying that a total of zero qubits are available to the second quantum service.

15. The method of claim 1 wherein determining, by the qubit allocation service, that the first quantum service requires the qubit for execution further comprises determining, by the qubit allocation service, that the first quantum service requires the first qubit and a second qubit for execution;
and wherein accessing, by the qubit allocation service, the qubit registry to identify the first qubit of the plurality of qubits that is available for allocation further comprises accessing, by the qubit allocation service, the qubit registry to identify the first qubit, which is available on a first quantum computing system, and the second qubit, which is available on a second quantum computing system;
storing information indicating the first qubit and the second qubit are no longer available for allocation; and
providing, by the qubit allocation service to the first quantum service, the qubit information via which the first quantum service can determine that the first qubit on the first quantum computing system and the second qubit on the second quantum computing system are allocated to the first quantum service.

16. The method of claim 15 further comprising:
generating, by the qubit registry, an qubit update record identifying the first qubit and the second qubit as being allocated to the first quantum service; and
sending, by the qubit registry to at least one other qubit registry, the qubit update record.

17. A computer program product stored on a non-transitory computer-readable storage medium and including instructions to cause a processor device to:
determine that a first quantum service requires a qubit;
access a qubit registry that maintains information about a plurality of qubits on a quantum computing system to identify a first qubit that is available for allocation;
store information indicating the first qubit is allocated to the first quantum service;
in response to the first qubit being allocated to the first quantum service, decrement an integer value that is classically stored in a total available qubits counter of the qubit registry service by an integer of value one, wherein the decremented integer value stored in the total available qubits counter is an integer value indicating a total number of qubits that are currently available for allocation and the total available qubits counter is a classical counter;
provide, to the first quantum service, an identifier via which the first quantum service can determine that the first qubit is allocated to the first quantum service;
receive, by the qubit registry, a request from a second quantum service requesting a total number of qubits available for allocation to the second quantum service;

determine, by the qubit registry, that no qubit partition is associated with the second quantum service; and in response to determining that no qubit partition is associated with the second quantum service, send, to the second quantum service, information identifying that a total of zero qubits are available for allocation to the second quantum service.

18. A quantum computing system, comprising:

a memory; and a processor device coupled to the memory to:
 determine, by a qubit allocation service, that a first quantum service requires a qubit for execution by:
  analyzing, by the qubit allocation service, a quantum assembly file (QASM) file that implements the first quantum service; and
  determining, based on the QASM file, that the first quantum service requires the qubit for execution;
 in response to determining that the first quantum service requires the qubit for execution, access, by the qubit allocation service, a qubit registry that maintains information about a plurality of qubits on a quantum computing system to identify a first qubit of the plurality of qubits that is available for allocation;
 store information indicating the first qubit is allocated to the first quantum service;
 in response to the first qubit being allocated to the first quantum service, decrement an integer value that is classically stored in a total available qubits counter of the qubit registry service by an integer of value one, wherein the decremented integer value stored in the total available qubits counter is an integer value indicating a total number of qubits that are currently available for allocation and the total available qubits counter is a classical counter; and
 provide, by the qubit allocation service to the first quantum service, qubit information via which the first quantum service is enabled to determine that the first qubit is allocated to the first quantum service.

* * * * *